(12) United States Patent  (10) Patent No.: US 7,089,144 B2
Mosher  (45) Date of Patent: Aug. 8, 2006

(54) DETERMINING IMPACT OF TEST OPERATIONS AT A PRODUCT ASSEMBLY AND TEST FACILITY WITH REPAIRABLE PRODUCT

(75) Inventor: James H. Mosher, Pickerington, OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 156 days.

(21) Appl. No.: 10/919,617

(22) Filed: Aug. 17, 2004

(65) Prior Publication Data

US 2006/0052966 A1    Mar. 9, 2006

(51) Int. Cl.
    *G06F 19/00* (2006.01)
(52) U.S. Cl. .................. 702/125; 702/89; 702/176; 702/187; 700/306; 368/89
(58) Field of Classification Search ............. 702/125, 702/124, 79, 89, 176, 187, 186, 182; 327/291; 700/306; 713/400; 368/89
See application file for complete search history.

(56) References Cited

U.S. PATENT DOCUMENTS

| 3,870,953 A | * | 3/1975 | Boatman et al. ............ 324/72.5 |
| 4,066,882 A | * | 1/1978 | Esposito ..................... 714/724 |
| 5,953,689 A | * | 9/1999 | Hale et al. .................. 702/186 |
| 6,381,556 B1 | * | 4/2002 | Kazemi et al. ............. 702/182 |

\* cited by examiner

*Primary Examiner*—John Barlow
*Assistant Examiner*—Hien Vo

(57) ABSTRACT

A method and apparatus for establishing an average test time ($T_A$) include determining a first time interval ($T_G$) nominally associated with non-failing testing of a unit under test (UUT), and determining a second time interval ($T_{PR}$) nominally associated with troubleshooting and repairing a failed unit under test. Additionally, a percent yield (Y) nominally associated with a proportion of non-failing units under test is determined. The average test time is a sum of the first time interval associated with the non-failing testing of the UUT, and a ratio of the second time interval associated with troubleshooting and repair of a failed UUT with respect to the yield.

47 Claims, 10 Drawing Sheets

DETERMINING IMPACT OF TEST OPERATIONS AT A PRODUCT ASSEMBLY AND TEST FACILITY WITH REPAIRABLE PRODUCT

FIELD OF INVENTION

The present invention relates to conveying information regarding testing, troubleshooting, and repairing of products at a product assembly facility. More particularly, the present invention relates to determining how to allocate resources associated with testing products to improve throughput of such products.

DESCRIPTION OF THE BACKGROUND ART

Manufactures of goods (i.e., products) convert (e.g., assemble) raw materials, components, sub-assemblies, and/or the like into finished products. Test operations are implemented either as part or after the manufacturing process to provide quality control and ensure customer satisfaction for the finished products. Test operations are considered a reverse-flow process for the product. In particular, if a unit under test (UUT) fails testing, the failed unit undergoes troubleshooting, repair, and retest. This process continues until the UUT either passes retest or is scrapped.

Product planning is used to estimate when a finished product will be available to the consumer. Product planning with respect to test operations currently includes introducing new product (finished product) at the test facility, where the product is tested and identified as either passing or failing. Passing product is shipped, while failing product is repaired and retested. Specifically, the failed product loops through the repair and test processes until all units have passed. Rarely is an entire system scrapped, since most manufacturing entities are high level systems that do not make an allowance for scrap. More likely, a sub-system or unit will be replaced. Product planners of test operations estimate an average test time (T) required for testing, troubleshooting, and repairing the finished product.

Specifically, for N units of finished product being tested and a test time interval of $T_G$ to conduct each test, the total test time for testing N units of finished product is $NT_G$. If the percent yield is Y, then (1−Y) units must undergo troubleshooting and repair. The time interval to troubleshoot and repair a unit under test is $T_{PR}$. Therefore, the total time to test these N units of product is:

$$T = N^*T_G + (1-Y)^*N^*(T_G + T_{PR}), \quad (1)$$

where $T_G$ represents the time interval to test a product, assuming no failure during the test, $T_{PR}$ is the time interval to troubleshoot and repair a failing product, and Y is the yield (proportion of passing units).

Dividing by N, the Average Test Time estimates are determined by the equation:

$$\overline{T} = T_G + (1-Y)^*(T_G + T_{PR}) \quad (2)$$

Equation (2) represents a first order approximation of the average test time. The Average Test Time of Equation (2) may be expanded to a second order approximation of average test time, in order to account for failures after the first repair, wherein:

$$T = T_G + (1-Y)^*(T_G + T_{PR}) + (1-Y)^2*(T_G + T_{PR}). \quad (3)$$

It is noted that this basic model assumes that the troubleshooting and repair occurs at the test facility. Therefore, all time incurred consumes the test facility. When there are no defective products (i.e., the yield is 100%), the average time per unit is $T_G$, which is defined as the good test time in Equation (1).

When the process yields less than perfect product the overall yield declines, and the average test time increases significantly from the good test time interval $T_G$. That is, as the yield goes down the average time to test a product increases significantly. As will be shown, this first order approximation of Equation (2) for the average test time works reasonably well for yields above 80%, while the second order approximation of Equation (3) works reasonably well for yields above 70%. However, as the yield drops below 70%, the average test time estimates provided by Equations (2) and (3) significantly underestimate the time it will take, on average, to move product through the test process.

Thus, current Average Test Time model of Equations (2) and (3) fail to account for significant factors that need to be recognized when estimating the average test time contribution for product planning. Therefore, there is a need in the art for a method and apparatus for determining impact of test operations at a product assembly and test facility with repairable products.

SUMMARY OF THE INVENTION

The disadvantages heretofore associated with the prior art are overcome by a novel method and apparatus for establishing an average test time ($T_A$). The method and apparatus include determining a first time interval ($T_G$) nominally associated with non-failing testing of a unit under test (UUT), and determining a second time interval ($T_{PR}$) nominally associated with troubleshooting and repairing a failed unit under test. Additionally, a percent yield (Y) nominally associated with a proportion of non-failing units under test is determined. The average test time ($T_A$) is determined according to the relationship of $T_A = T_G + (T_G + T_{PR})((1-Y)/Y))$.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
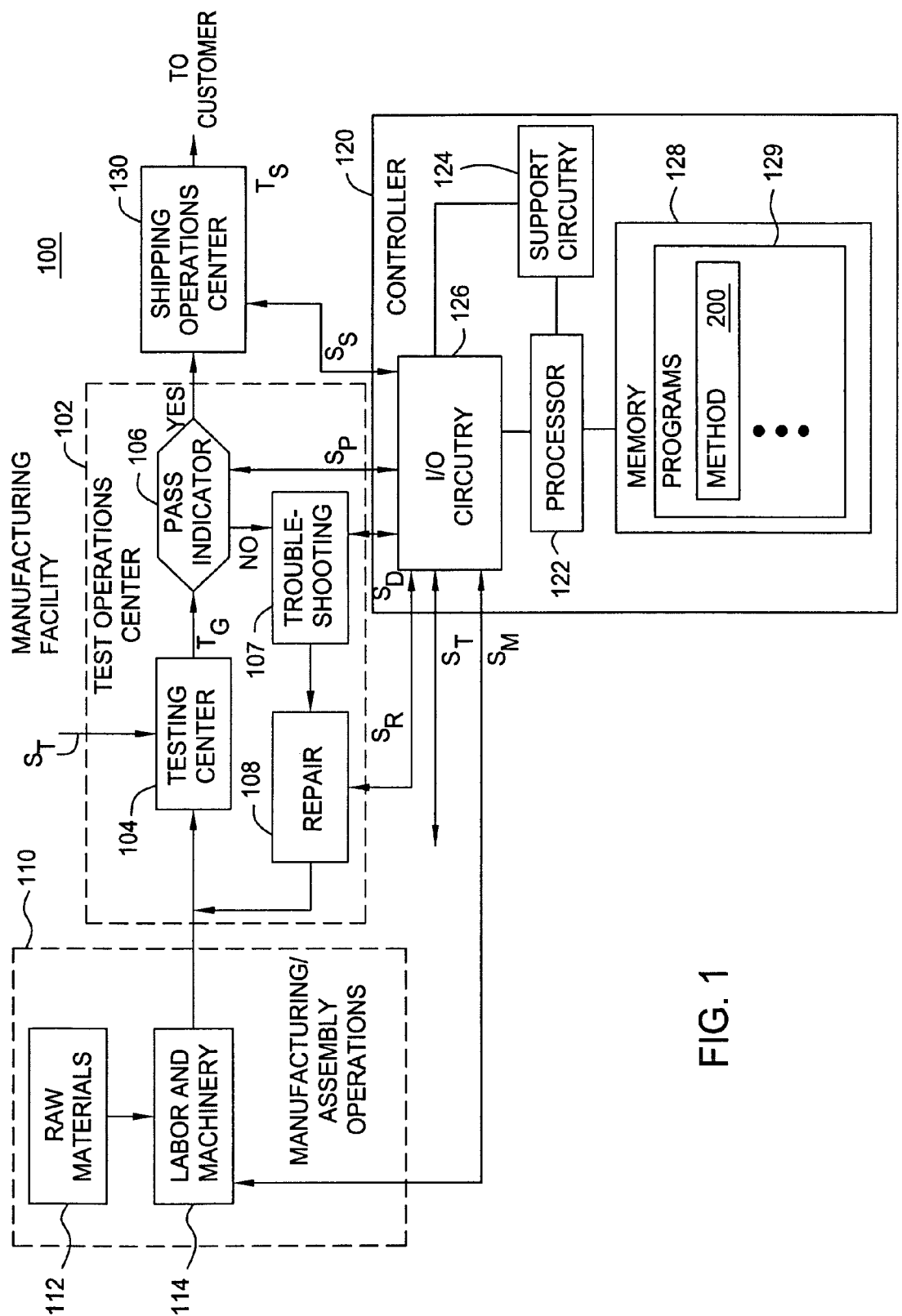
FIG. 1 depicts a high-level block diagram of an exemplary product manufacturing and assembly facility having a test operations center suitable for implementing the present invention.

FIG. 1 depicts a high-level block diagram of an exemplary product manufacturing and assembly facility 100 having a test operations center 102 suitable for implementing the present invention. The exemplary product manufacturing and assembly facility 100 comprises manufacturing and assembly operations 110, test operations 102, a shipping operations center 130, and at least one facility controller 120. The manufacturing and assembly operations 110 include labor and machinery 114 that implement processes and techniques for systematically converting specified resources, such as raw materials, components, subassemblies, and the like, into finished products (goods).

It is noted that the present invention is discussed in terms of mass producing a type of product, such that the term "product" represents a specific type of good (item), where multiple units of the product are illustratively made sequentially or contemporaneously in lots or in bulk. However, one skilled in the art will appreciate that the present invention may be implemented for products made in small quantities or single item quantities. Additionally, the products that are manufactured and/or assembled may form subassemblies for inclusion into other products, such as for example, speakers for inclusion into a multimedia device (e.g., television or radio). It is further noted that the manufacturing and assembly operations 110 are not considered as part of the present invention, however, are included to present a complete understanding of the implementation of the present invention with respect to a product manufacturing and assembly facility 100.

Once the finished products are manufactured and/or assembled, the products are tested at the test operations center 102. The test operations center 102 comprises a testing center 104, a pass test indicator 106, and a troubleshooting center 107 and a repair center 108. The testing center 104 includes test equipment and personnel suitable for testing and/or inspecting each unit of the product produced by the manufacturing and assembly operations 110. The actual diagnostics and testing conducted depends on the type of product, its specifications, and requirements associated with quality, reliability, and maintainability disciplines, as well as the expectations of the end-user customer.

In one embodiment, the testing center 104, pass indicator 106, and the troubleshooting and repair center 108 may be considered as functional aspects of the test operations center 102, as opposed to separate and distinct facilities. In this embodiment, a single test and repair device or group of test and repair devices may perform two or more of these functional aspects. For example, most test equipment includes some type of pass and/or fail indicator incorporated into the test equipment.

Once a unit under test (UUT) is tested, a pass (and/or fail) indicator 106 provides indicia of whether the tested unit passed or failed the testing 104. The pass indicator 106 may be any audio device (e.g., bell), visual device (e.g., colored light), or any other communication device capable of communicating whether the unit passed or failed the test.

If the UUT passes the testing/inspection during the first time it is tested, the unit is sent to the shipping operations center 130 for delivery to the customer. However, if the tested unit fails, then the failed unit is sent to the troubleshooting center 107 for diagnostics, followed by the repair center 108 for repair. The troubleshooting center 107 and repair center 108 respectively comprise diagnostic and repair equipment, as well as personnel suitable for performing such diagnostics and repairs for the product. Once the failed unit has been diagnosed and repaired, the repaired unit is sent back to the testing center 104 for retest. If the repaired unit passes the retest, it is sent to the shipping operations center 130, otherwise it repeats through the repair and retest cycle until it is either properly repaired or scrapped.

The shipping operations center 130 may be any conventional shipping operation or product transportation department having shipping equipment and personnel capable of receiving the fully tested final product, and making such product available for delivery to the customer. The shipping operations center 106 does not form a part of the present invention, but is presented for a complete understanding of its relationship to the test operations center 102 within the context of the manufacturing and assembly facility 100.

The manufacturing and assembly facility 100 further comprises at least one controller 120 that is suitable for controlling operations at each of the operation centers and therebetween. Specifically, the controller 120 comprises a processor 122, as well as memory 128 for storing various control programs 129. The processor 122 may be any conventional processor, such as one or more processors illustratively manufactured by Intel Corporation of Santa Clara, Calif. The memory 128 may comprise volatile memory (e.g., RAM), non-volatile memory (e.g., disk drives) and/or a combination thereof. The processor 122 cooperates with support circuitry 124, such as power supplies, clock circuits, cache memory, among other conventional support circuitry, to assist in executing software routines (e.g., method 200) stored in the memory 128.

As such, it is contemplated that some of the process steps discussed herein as software processes may be implemented within hardware, for example, as circuitry that cooperates with the processor 122 to perform various steps. It is noted that an operating system (not shown) and optionally various application programs (not shown) may also be stored in the memory 128 to run specific tasks and enable user interaction. The controller 120 also comprises input/output (I/O) circuitry 126 that forms an interface between various functional elements communicating with the controller 120. It is further noted that the processing steps of the present invention may be stored in a computer readable medium (i.e., memory devices such as RAM, floppy disk drives, among other memory devices), which when executed by a processor of, for example, a general-purpose computer performs the process steps described herein.

For example, as shown in FIG. 1, the exemplary controller 120 may communicate with the devices associated with the manufacturing and assembly operations center 110 via exemplary signal path $S_m$, and the shipping operations center 130 via exemplary signal path $S_s$. Furthermore, the controller 120 may communicate with the exemplary functional components of the test operations center 102, such as the testing center 104 via signal path $S_t$, the pass test indicator 106 via signal $S_p$, the troubleshooting center 107 via signal $S_d$, and repair center 108 via signal path $S_r$. It is noted that the at least one controller 120 may also communicate with other functional elements (not shown) of the manufacturing and assembly facility 100, as required.

Although the controller 120 of FIG. 1 is depicted as a general-purpose computer that is programmed to perform various control functions in accordance with the present invention, the invention can be implemented in hardware such as, for example, an application specific integrated circuit (ASIC). As such, it is intended that the processes described herein be broadly interpreted as being equivalently performed by software, hardware, or a combination thereof. Furthermore, although the exemplary controller 120 is shown as a single controller unit, a person skilled in the art will appreciate that a plurality of controllers may be implemented at the manufacturing and assembly facility 100 to control one or more functional aspects of at least one operations center. In such embodiment, the plurality of controllers may be organized as a network of controllers to provide shared control of the manufacturing and assembly facility 100.

As discussed with respect to FIGS. 2–10, the present invention addresses the shortcomings of the average test time model set forth in Equations (2) and (3). Specifically, the present invention provides for the possibility that the first test yield may differ from the retest yield. In one embodiment, the average test time may be computed as:

$$\overline{T} = T_G + (T_G + T_{PR}) \times \left(\frac{1-Y}{Y}\right), \tag{4}$$

where $T_G$ represents the time interval to test a product, assuming no failure during the test, $T_{PR}$ is the time interval to troubleshoot and repair a failing product, and Y is the yield (percentage) of units under test passing the test the first time.

The average test time under Equation (4) indicates that the test interval lengthens as the yield decreases. For many product lines, test yields may be low during initial and early product line testing operations. These low yields may be attributed to undiscovered product design flaws, unfamiliarity with testing, troubleshooting, and/or repair of the products, among other early stage product development and manufacturing. As the learning curves diminish, the failure mechanisms have been identified and resolved, the test operations have been refined and/or are in a "mature" stage of operation, then the test yields are usually substantially higher. A manufacturer that is producing new types of products or is in the early stages of test operations needs to have an accurate model of the average test time in order to properly allocate resources (e.g., test equipment, technicians, among other resources), as well as provide its customers with a realistic schedule for delivering its finished products.

Figure 10:
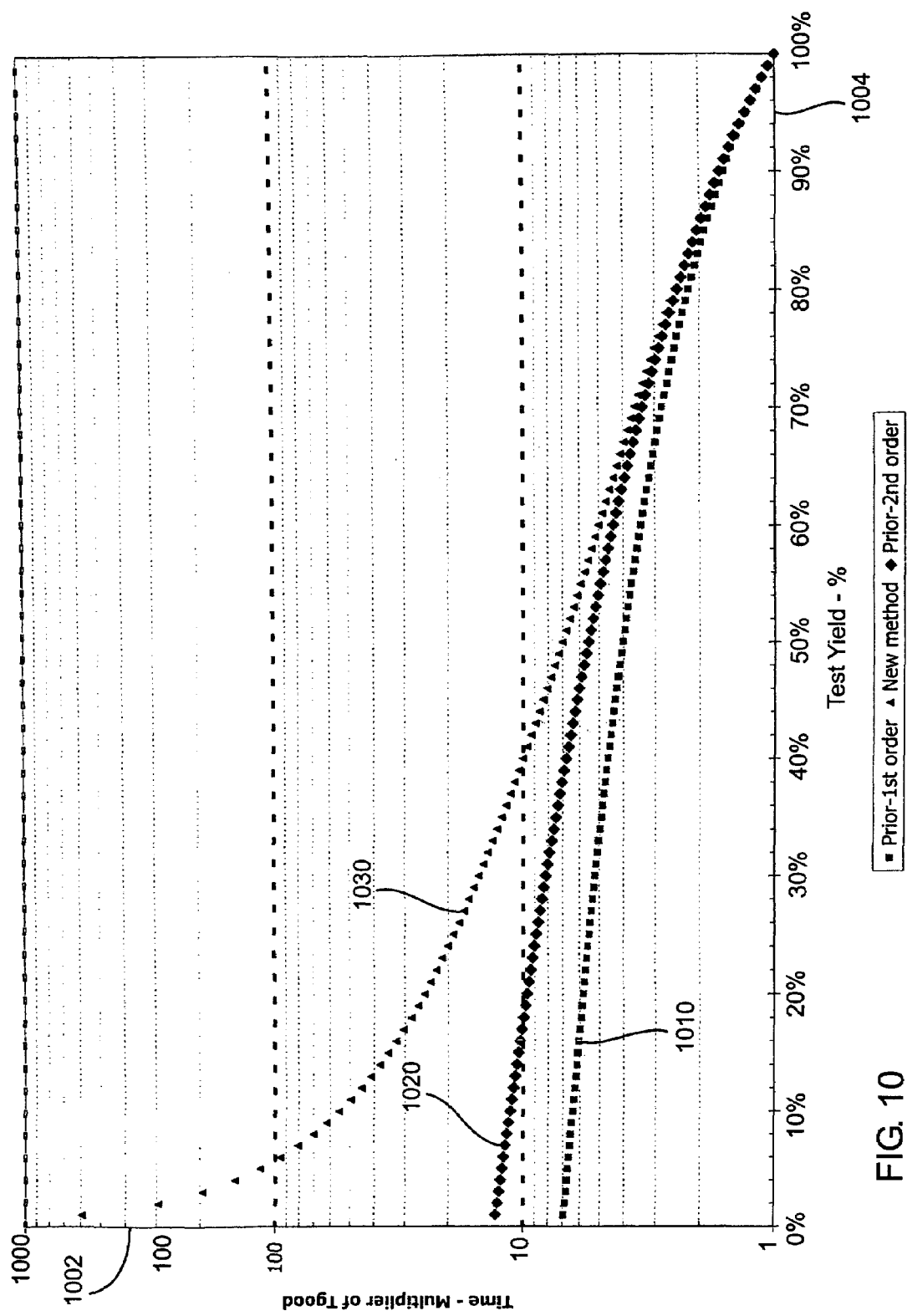
FIG. 10 depicts a graph 1000 illustrating differences between prior art average test times versus an average test time in accordance with the principles of the present invention.

FIG. 10 depicts a graph 1000 illustrating differences between prior art average test times versus an average test time in accordance with the principles of the present invention. In particular, the ordinate 1002 represents the Average Test Time (e.g., logarithmic scale), and the abscissa 1004 represents the test yield. Curves 1010, 1020, and 1030 represent the average troubleshooting and repair time as a multiple of the test time. Curve 1010 represents the average troubleshooting and repair time as computed by the prior art first order approximation of Equation (2). Curve 1020 represents the average troubleshooting and repair time as computed by the prior art second order approximation of Equation (3).

Curve 1030 represents the average troubleshooting and repair time as computed by the average test time approximation of the present invention under Equation (4). Referring to FIG. 10, for test yields around 70% the three curves 1010, 1020, and 1030 indicate an average test time between 3 to 3.5 time units. However, for test yields below 70%, the time intervals between the curves diverge. For example, the prior art curves 1010 and 1020 respectively associated with the first and second order approximations under Equations (2) and (3) have average test times that are approximately tripled at a ten (10) percent yield, as compared to the 70% yield for the same. By contrast, the test time approximation of the present invention under Equation (4) illustrates that the average test time increases approximately one-hundred-fold (100×) at the 10% test yield.

As illustratively shown in FIG. 10, the prior art techniques for approximating average test time are quite inadequate to predict the required test time required when test yields are below 70%. Such deficiencies in prior art test modeling may lead to poor planning in terms of allocating resources by the manufacturing entity, as well as failing to meet customer expectations for delivering the product.

Figure 3:
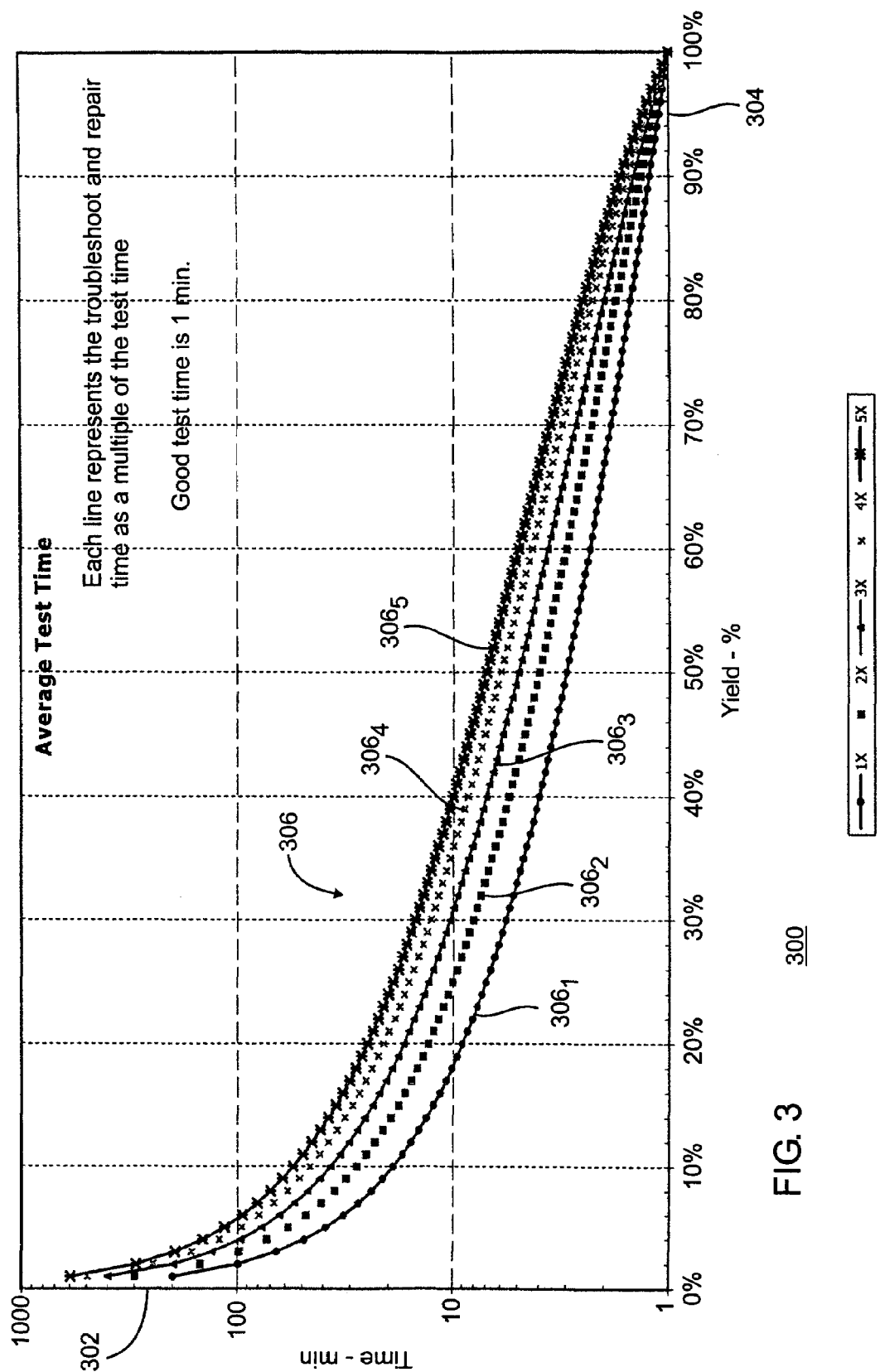
FIG. 3 depicts a graph representing average test time versus test yield.

FIG. 3 depicts a graph 300 representing average test time versus test yield. In particular, the ordinate 302 represents the Average Test Time (e.g., logarithmic scale), and the abscissa 304 represents the test yield. Curves 306₁ through 306₅ (collectively curves 306) represent the troubleshooting and repair time as a multiple of the test time. Since the good test time $T_G$ is set to one unit of time, the average test time in the graph represents a multiplier of time and cost for less than perfect product. For example, curve 306₃ represents troubleshooting and repair time that is three times as long as the good test time $T_G$. The curves 306 illustrate that as the yield 304 goes down, the average time to test a product increases significantly. That is, as the test yield 304 decreases, the average time to repair increases in a non-linear manner, such that as the yield approaches zero, the average test time exceeds 100 units.

Although Equation (4) provides good general purpose model for approximating average test time over a range of test yields, the Average Test Time model of Equation (4) does not account for the possibility that the yield during repair may differ from the yield during initial (i.e., first) testing of the products. For example, a first test may yield a 70% pass rate, while the yield after troubleshooting and repair may be only 60%. If the yield after troubleshooting and repair differs, the actual average test time will be greater than the estimated average test time found by using Equation (4). Therefore, unforeseen delays may occur while producing product for delivery (i.e., throughput), which may not be acceptable to a customer for such products.

Another problem is that the average test time defined by Equation (4) does not resolve what may happen if there is a serious process problem, such that the initial yield is zero. By using Equation (4), the average test time approaches infinity, which is mathematically correct, but realistically not very helpful to address customer inquiries regarding when they will receive their products.

The present invention modifies Equation (4) such that the average test time accounts for a first test yield and a retest yield, and is defined as:

$$\overline{T} = T_G + (T_G + T_{PR}) \times \left(\frac{1-Y_F}{Y_R}\right), \tag{5}$$

where $Y_F$ is the first test yield and $Y_R$ is the retest yield. Equation (5) is distinguished from Equation (4), since Equation (5) asserts that as long as there is some yield after going through a troubleshooting and repair loop (e.g., where $Y_F$=0), eventually all the unit under test (UUT) will be available for shipment to the customer. It is noted that Equation (5) is utilized under the assumption that the troubleshooting and repair processes are being performed on-line at the test set, as opposed to being performed off-line.

Figure 4:
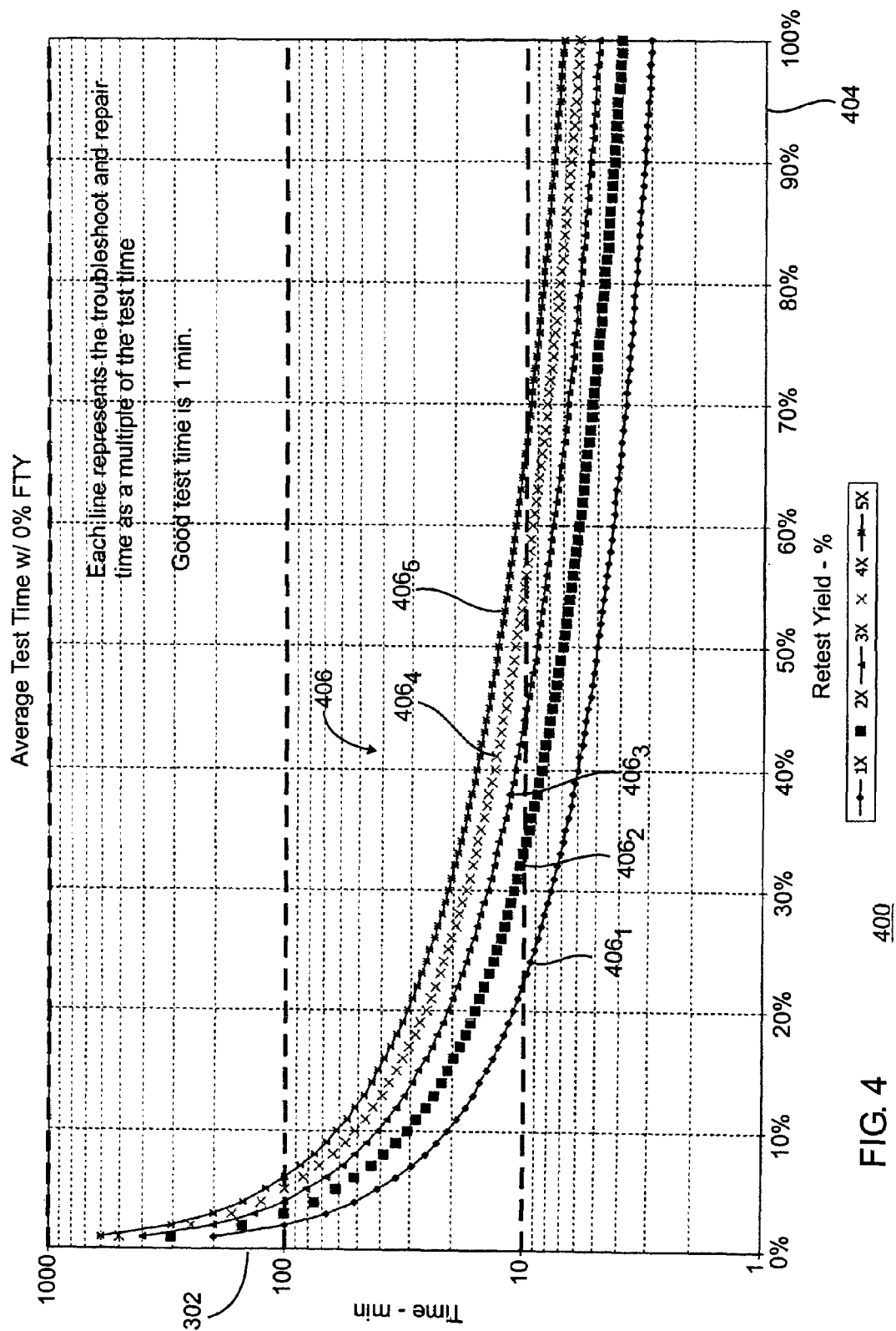
FIG. 4 depicts a graph representing average test time versus test yield in accordance with the principles of the present invention.

FIG. 4 depicts a graph 400 representing average test time versus test yield in accordance with the principles of the present invention. The graph 400 reflects the possibility that the first test time yield $Y_F$ and the troubleshooting and repair yield $Y_R$ may be different, in accordance with Equation (5). The graph 400 is the same as graph 300 of FIG. 3, where curves $406_1$ through $406_5$ (collectively curves 406) represent the troubleshooting and repair time as a multiple of test time. However, the curves 406 are drawn by setting the first test yield $Y_F$ to zero, and only varying the retest yield $Y_R$. Referring to FIG. 4, for curve $406_3$, which represents the 3× repair time curve, at 45% retest yield (and 0% first test yield), the total test time is 10× the good average test time. If the yield drops, for example, at a 30% retest yield, the total test time is close to 15× the good average test time. Therefore, as the retest yield decreases, the average test time increases.

One common technique for enhancing the capacity of a test system is to abort the test upon failure, rather than going through the entire test sequence. In some instances it is not possible to continue a test once there is a failure, but in many other situations it could be done. To account for the effect on the average test time due to early termination, Equation (5) is modified to the following:

$$\overline{T} = T_G + (P_C T_G + T_{PR}) \times \left(\frac{1-Y_F}{Y_R}\right), \quad (6)$$

where $P_C$ is the percent of the test that is completed prior to termination from the failed test step.

Equation (6) may be used by a planner for the test operations center 102 to answer various questions associated with supporting the testing, troubleshooting, and repairing of the products. For example, the total time to test, troubleshoot, repair and retest Q units (where Q is a positive number), assuming the assembly time requirements and any allowance for procuring materials are ignored, is given by:

$$\text{TotalTestTime} = Q \times \overline{T}. \quad (7)$$

As long as the Total Test Time calculated using Equation (7) is less than the allotted time to produce the order (i.e., deliver the order to the customer), there is no problem. However, if the time required is longer than the allotted time period, then a computation may be made to determine how many test assets will be required to support the specified program. If the allotted time period is $T_{PD}$, and the time a test asset is available within that interval is $T_{SA}$, (where $T_{SA} \leq T_{PD}$), then the number of test systems required is:

$$\text{\#TestSystemsNeeded} = \frac{Q \times \overline{T}}{T_{SA}}. \quad (8)$$

A person skilled in the art will appreciate that it is not possible to have a fraction of a test system. Therefore, for a test system that is dedicated to only one product, the principle options available include rounding up to the next integer number of test systems, working extended hours on the current staffing plan, and/or adding shifts to provide more availability. The rounding up of test systems option may be acceptable under two conditions: (i) if the fraction is a large portion of a test system (e.g., >50%), and (ii) if the cost of the system is small compared to the costs incurred utilizing other alternatives.

The option of working extended hours on existing shifts may be an acceptable and economical choice, although it is best applied when the length of time for additional capacity is short. Working longer hours on a routine basis has been observed to diminish the workers effectiveness. The option of adding a shift may be prudent when (i) the work load will be for an extended period of time, and (ii) the facilities cost is high.

There are other possible options, depending on the lead-time available to implement a plan. For example, depending on the amount of lead-time, a planner might consider trying to improve the yield or shorten the test time to effectively generate additional capacity. In addition, off-loading some of the work from the test system, e.g. repair or troubleshooting may also be an option, as discussed below in further detail.

Another question that may be answered by Equation (6) is how many associates are required to support the execution of the specified program. In a manor similar to the number of test systems required, the staffing level is given by:

$$\text{Staff \#} = \frac{Q \times \overline{T}}{T_{AA}}, \quad (9)$$

where $T_{AA}$ is the time each staff member is available within the allotted time period $T_{PD}$. It is noted that the discussion associated with Equation (8) is applicable with respect to Equation (9) as well.

Given the loaded rate per time period of the operator performing the test, $C_{\$T}$, the average cost is given by:

$$\text{Cost/unit} = C_{\$T} \times \overline{T}. \quad (10)$$

Based on Equation (6), the average cost for troubleshoot, repair and retest is:

$$\text{Cost/unit} = C_{\$T} \times (\overline{T} - T_G) \quad (11)$$

The troubleshooting, repair, and retest (TS&R) costs are a part of the average cost to test a unit. This TS&R cost may be a significant part of the total cost if the first test yield $Y_F$ is low or if the ability to diagnose failures is poor (this leads to low $Y_R$), or if the time to perform troubleshooting or repair is excessive (large $T_{PR}$).

Equation (6) may also be utilized to help determine a particular action to take, for example, if additional resources are available to improve the process. Such additional resources may illustratively be used to reduce the test time $T_T$, reduce the troubleshoot/repair time $T_{PR}$, or improve the yields $Y_F$ and $Y_R$. Although there is no one correct answer (other than "it depends"), Equation (6) can be differentiated with respect to each of the independent variables.

Thus, a change in average test time $T_A$ caused by a change in the good test time $T_G$ is given by:

$$\Delta \overline{T} = \left(1 + P_C\left(\frac{1-Y_F}{Y_R}\right)\right) \times \Delta T_G. \quad (12)$$

Moreover, a change in the average test time $T_A$ caused by a change in the troubleshoot and repair (retest) time $T_{PR}$ is given by:

$$\Delta \overline{T} = \left(\frac{1-Y_F}{Y_R}\right) \times \Delta T_{PR}. \quad (13)$$

A change in average test time $T_A$ caused by a change in yield Y is given by the two equations:

$$\Delta \overline{T} = -\frac{(P_C T_G + T_{PR})}{Y_R} \times \Delta Y_F, \quad (14)$$

which represents the impact of a change in First Test Yield, and $$\Delta \overline{T} = -(P_C T_G + T_{PR})(1-Y_F) \times \frac{Y_{R2} - Y_{R1}}{Y_{R2} \times Y_{R1}}, \quad (15)$$

which represents the impact of a change in Repair test yield.

It is a responsibility of test operations managers to use the resources available to them efficiently, since the test systems represent the most significant investment in the final assembly and test (FA&T) operations. Thus, it is important to be able to determine how effectively the capital resources are being used. From the previous analysis of Equation (8), the number of test systems required may be determined, and caveats were given on why it might be prudent to install more facilities than the calculation indicated. If the actual number of test systems deployed is $N_S$, then the percent utilization of the test systems may be determined.

The percent utilization represents the fraction of available time the facility is in use. This is a measure of how well resources are being employed, such as the test systems, which may be expensive. Utilization may range from 0% (you are not using the facility at all) to 100% (full usage). However, as a practical matter, typical utilization is maximized at approximately 85%, since levels above 85% usually are beyond management's ability to efficiently manage the people who staff the facility, maintenance, and the like. The percent utilization is given by:

$$\text{Utilization} = \frac{Q \times \overline{T}}{N_S \times T_{SA}} \times 100\%. \quad (16)$$

The embodiment of the average test time $T_A$ as per Equation (6), and the subsequent corresponding Equations (7–16) of the present invention may best be understood by the following example. An order, illustratively, for 200 pieces of a particular product is received by the manufacturing and assembly facility 100, with customer delivery requested in two weeks. For this example, the product historically has a good test time of one hour, a troubleshooting and repair time of three hours (3×), a first test yield $Y_F$ of 70%, and a retest yield $Y_R$ of 60%. The operation is run five days, two shifts, and each associate works forty hours per week. The portion of the test completed $P_C$ when a failure occurs is 50% on average.

Starting with the average test time per product which is given by Equation (6), the Average Test Time is:

$$\overline{T} = T_G + (P_C T_G + T_{PR}) \times \left(\frac{1-Y_F}{Y_R}\right) =$$

$$\overline{T} = 1 + (.5 \times 1 + 3) \times \frac{1-70\%}{60\%} = 2.75 \text{ hours.}$$

The number of test systems required to support a projected production program may be found from Equation (7), where TotalTestTime=Q×$\overline{T}$=200×2.75 hours=550 Hrs.

With the operation running a five (5) days, each day having two (2) shifts, there are 80 hours per week available, so for two weeks there are 160 hours of test system capacity. Thus, from Equation (8) the number of test systems required $$\#TestSystemsNeeded = \frac{Q \times \overline{T}}{T_{SA}} = \frac{550}{160} = 3.44.$$

Since there cannot be a fraction of a test system, a decision needs to be made regarding how to handle the customers' need. One possible solution is to round up to four test systems; In this instance, there will be more than enough capacity, and nothing else needs to change. However, this first solution will require tying up additional capital that may impact the utilization of the facility resources.

A second solution is to ask the customer to spread out the acceptance of the product over a longer time interval. In some instances this may be acceptable, although a drawback may be a loss of confidence by the customer to meet production schedules.

A third solution is to work additional hours within the time period requested by the customer. This solution may be satisfactory, as long as the necessary human resources are available to perform the work. However, prolonged use of overtime tends to overburden the staff, and consequently lower their productivity. These three solutions are discussed below in further detail with respect to assessing utilization.

The cost added to each product for the testing is derived from Equation (10). Assuming $100 per hour for a fully loaded testing rate, Cost/Unit is: Cost/unit=$C_{\$T}$×$\overline{T}$=$100×2.75=$275.00.

The cost added to each product for troubleshooting/repair and retest is derived from Equation (11), where Cost/unit=$C_{\$T}$×($\overline{T}$-$T_G$)=$100×(2.75-1)=$175.00. It is noted that the cost added into the average, is more than the cost of a good test ($100), while 70% of the products pass the first time. Further, the average expenditure for each failing unit is $583 in addition to the good test cost, $$\text{where} \frac{\text{Avg repair cost} \times \text{volume}}{(1-Y) * \text{volume}} = \frac{\$175 \times 100}{(1-70\%) \times 100} = \frac{\$17500}{30} = \$583.33.$$

In other words, the 30 units that require repair each cost $583 to repair and drive the average cost up by $175. This is the motivating force behind most quality movements, such as TQM, Six Sigma, among other quality related organizations and movements.

If additional resources are available to improve the process, a determination of how such additional resources should be utilized is made. In particular, the additional resources may be used to reduce the test time, reduce the troubleshoot/repair time, or improve the yield.

Assume that for a $3000 investment, a 10% improvement in good test time, or a 10% improvement in troubleshoot and repair time, or a 10% improvement in either the first test yield $Y_F$ and/or the repair yield $Y_R$ may be achieved. Equations (12–16) may be utilized to determine how the $3000 should be invested. Specifically, from Equation (12) the savings for a change in good test time $T_G$ is computed as $$\Delta \overline{T} = \left(1 + P_C\left(\frac{1-Y_F}{Y_R}\right)\right) \times \Delta T_G = \left(1 + 0.5\left(\frac{1-.70}{.6}\right)\right) \times (1 \text{ Hr} \times 10\%) = 0.20 \text{ hr.}$$

From Equation (13), the savings for a change in the troubleshoot and repair time $$T_R \text{ is } \Delta \overline{T} = \left(\frac{1-Y_F}{Y_R}\right) \times \Delta T_{PR} = \left(\frac{1-70\%}{75\%}\right) \times (3 \times 10\%) = 0.15 \text{ hr.}$$

From Equation (14) the savings for a change in the first test yield $Y_F$ is:

$$\Delta \overline{T} = -\frac{(P_C T_G + T_{PR})}{Y_R} \times \Delta Y_F = -\frac{(0.5 \times 1 + 3)}{0.6} \times (0.07) = 0.408 \text{ hr.}$$

From Equation (15) the savings for a change in repair test yield $Y_R$ is:

$$\Delta \overline{T} = -(P_C T_G + T_{PR})(1 - Y_F) \times \frac{Y_{R2} - Y_{R1}}{Y_{R2} \times Y_{R1}} =$$
$$-(0.5 \times 1 + 3)(1 - 0.7)\left(\frac{0.66 - 0.6}{0.6}\right) = 0.105 \text{ hr.}$$

Thus, Equations (12–14) show that for this example, the greatest savings comes from improving the first test yield $Y_F$, since the most hours (0.408 hrs) will be saved. Furthermore, by investing the capital to improve the first test yield $Y_F$, the cost of the improvement on the order for 200 pieces will produce a savings of Savings=200×0.408×$100=$8160. Since it will cost $3000 to implement the improvement, the net savings will be $5160 ($8160–$3000).

The number of associates (staff personnel) required to support the execution of the planned program is derived from Equation (9). From the exemplary information provided above, the staffing level needed is:

$$\text{Staff \#} = \frac{Q \times \overline{T}}{T_{AA}} = \frac{550}{40 \times 2} = 6.875.$$

Since a fractional number is determined, a decision to round up or work overtime must be analyzed in view of the external factors discussed above.

Finally, Equation (16) may be used to determine how effectively the capital resources are being utilized. Two different options are used for this utilization calculation. A first option is to round up the number of test systems to four test systems. From Equation (16), the utilization when four test systems are implemented is:

$$\text{Utilization} = \frac{Q \times \overline{T}}{N_S \times T_{SA}} \times 100\% = \frac{550}{4 \times 160} \times 100\% = 85.9\%$$

For the second option, three test systems are used, but eight hours of overtime are worked on Saturday for each shift. From Equation (16) working overtime, the available hours are changed to match what is being used.

$$\text{Utilization} = \frac{Q \times \overline{T}}{N_S \times T_{SA}} \times 100\% = \frac{550}{3 \times 192} \times 100\% = 95.5\%.$$

Although the second option appears to produce almost 10% greater utilization, consideration needs to be given to the possibility of system outage or down time, uneven flow of material, availability of operators, among other problems that may occur at the manufacturing and assembly facility 100. It is noted that there is no right answer, but rather a carefully assessed review of the risks being taken is provided.

The Average Test Time of Equation (6) may also be used to determine how does the test yield impact profitability. From the example used above, it is assumed that the conditions set there were the planned operating point. Specifically, plans were made using these values as the expected performance level, and expectations were set based on them (i.e., commitments to customers for shipping dates). The conditions include the good test time $T_G$ is 1 hour; the troubleshooting and repair time $T_R$ is 3× the good test time (i.e., 3 hours); the cost for test, as well as assembly $C_{\$T}$ is $100 per hour; it takes one hour to assemble the product; and the average test time for 70% yield is 2.75 hours per Equation (6).

At $100 per hour the labor cost for one-hour assembly and 2.75 hours of test is $375 ($100+$275). Assuming the $375 combined assembly and test cost represents five percent (5%) of the total manufacturing cost, then the total manufacturing cost is $7500. If the product is listed to sell at a price at two and one-half times the manufacturing cost, consequently the product sells for $18,750. It is assumed that the company is planning to earn a 35% gross margin (i.e., the difference between the selling price and the total costs). In this case the gross margin is $6562.50 ($18750× 0.35).

With the above assumptions and conditions, a determination may be made for what happens if a problem occurs that illustratively drops the first test yield (e.g., 50%). First, by putting 50% into the average test time Equation (6), the average test time is increases to 3.92 hours from the previous 2.75 hours. This represents an additional 1.17 hours of time, and $117 in cost in excess of the plan. If the gross margin is reduced by $117, to $6445.50, the margin becomes 34.38%, a reduction of 0.62%, which is a significant and undesirable result.

The Average Test Time of Equation (6) may also be used to determine how a change in yield affects delivery performance. As a manufacturer strives to meet or exceed its customer's expectations, it is very important that the manufacturer keep the promises made to its customers. These promises include delivery performance, which may be monitored by various delivery performance metrics. Here delivery performance is defined as a percentage or ratio of the number of products shipped on time, divided by the total number of products promised during the specified interval.

The discussion above examined how yield influences the time it takes to get the product through the test process. However, for purposes of further understanding the invention, the above example is expanded to look at the effect a change in yield has on the manufacturer's ability to ship the product when promised. It is assumed that the assembly interval is steadfast, and that the test operation 102 is the constraining resource.

It is desirable to know how to establish an interval for the test process that allows the manufacturer to meet the delivery performance metric. One way to make this determination is by looking at the test operations 102. In particular, since the test operation 102 is being run in such a manner that if a buffer preceding the test operations 102 always has assembled product stored therein, the only constraint on the ability to ship is how quickly product can be moved through the test process.

For a customer order of 100 units of the product, and the average test time being 2.75 hours, the manufacture can process (i.e., test) 1/2.75=0.364 units per hour. To process 100 units, it will take 100/0.364=275 hours. If during normal operations there is an expected downtime on the test system for maintenance and/or other unplanned events, a margin of safety must be built in to the process. In this example, the margin of safety is set to 15%, such that production is scheduled to utilize 85% of the systems capacity. This means the planned time testing will consume is 275/0.85=323.5 hours during the testing of this product. Thus, the manufacturer may commit to its customer that it can ship the 100 unit order in 323.5 hours.

Figure 5:
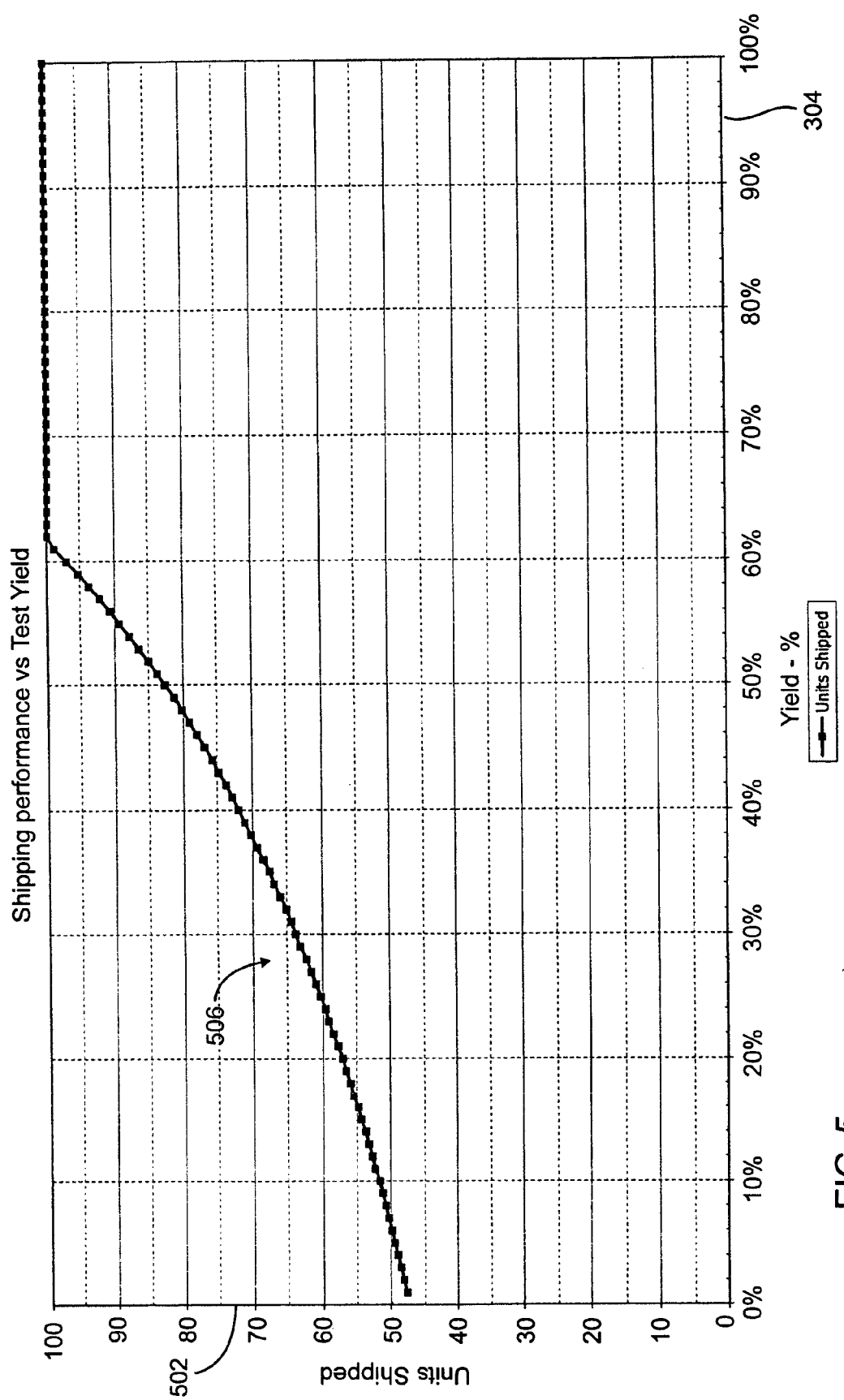
FIG. 5 depicts a graph representing shipping performance versus first test yield in accordance with the principles of the present invention.

FIG. 5 depicts a graph 500 representing shipping performance versus first test yield in accordance with the principles of the present invention. The graph 500 of FIG. 5 may be used to see what happens when the first test yield changes. The graph 500 comprises and ordinate 502 representing how many units of the product ship, and an abscissa 504 representing the first test yield. The curve 506 represents the shipping performance versus the first test yield $Y_F$ in accordance with Equation (6). Referring to curve 506, it is noted that the manufacturer is illustratively able to ship the entire order on time if the first test yield $Y_F$ drops from 70% to 62% for this example. Moreover, the manufacturer can still ship 95% of the order if the first test yield $Y_F$ drops down to 59%. These numbers reflect the fact that the manufacture has included a 15% margin of safety in order to account for downtime occurrences of the test operations 102.

In a second embodiment of the invention, the average test time is determined by distinguishing between the actual time it takes to perform the troubleshooting ($T_P$), and the actual time it takes to perform the repairs ($T_R$). Further, time is accounted for loading each unit under test, as well as disconnecting each unit under test from the test equipment.

Figure 2:
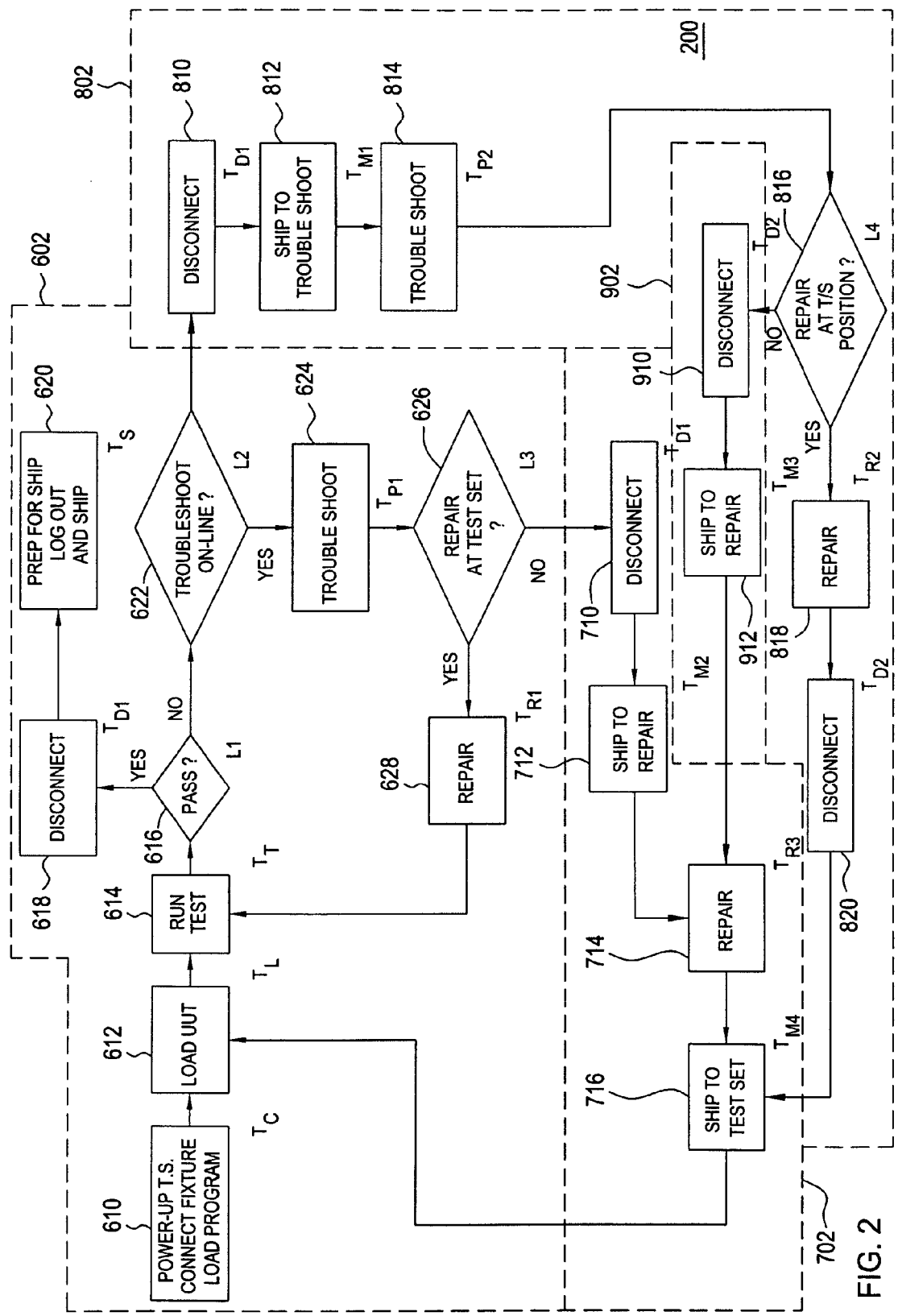
FIG. 2 is a flow diagram of a method for providing test operations at the manufacturing and assembly facility of FIG. 1.

FIG. 2 is a flow diagram of a method 200 for providing test operations at the manufacturing and assembly facility of FIG. 1. The flow diagram of FIG. 2 is formed by a plurality of sub-routines 602, 702, 802, and 902 that collectively define the test operations 102 under various operating conditions. FIGS. 6–9 depict flow diagrams of each of these subroutines, and should be viewed along with FIGS. 1 and 2.

In particular, the subroutine 602 illustrates testing each product using online troubleshooting and online repair prior to the product being shipped. Subroutine 702 illustrates testing each product using online troubleshooting and off-line repairs being made to defective product prior to the product being shipped. Subroutine 802 illustrates testing each product using off-line troubleshooting and online repairs prior to the product being shipped. Alternatively, subroutine 902 illustrates testing using both offline troubleshooting and offline testing prior to the product being shipped. The steps in each routine are respectively described in detail with respect to FIGS. 6–9.

Figure 6:
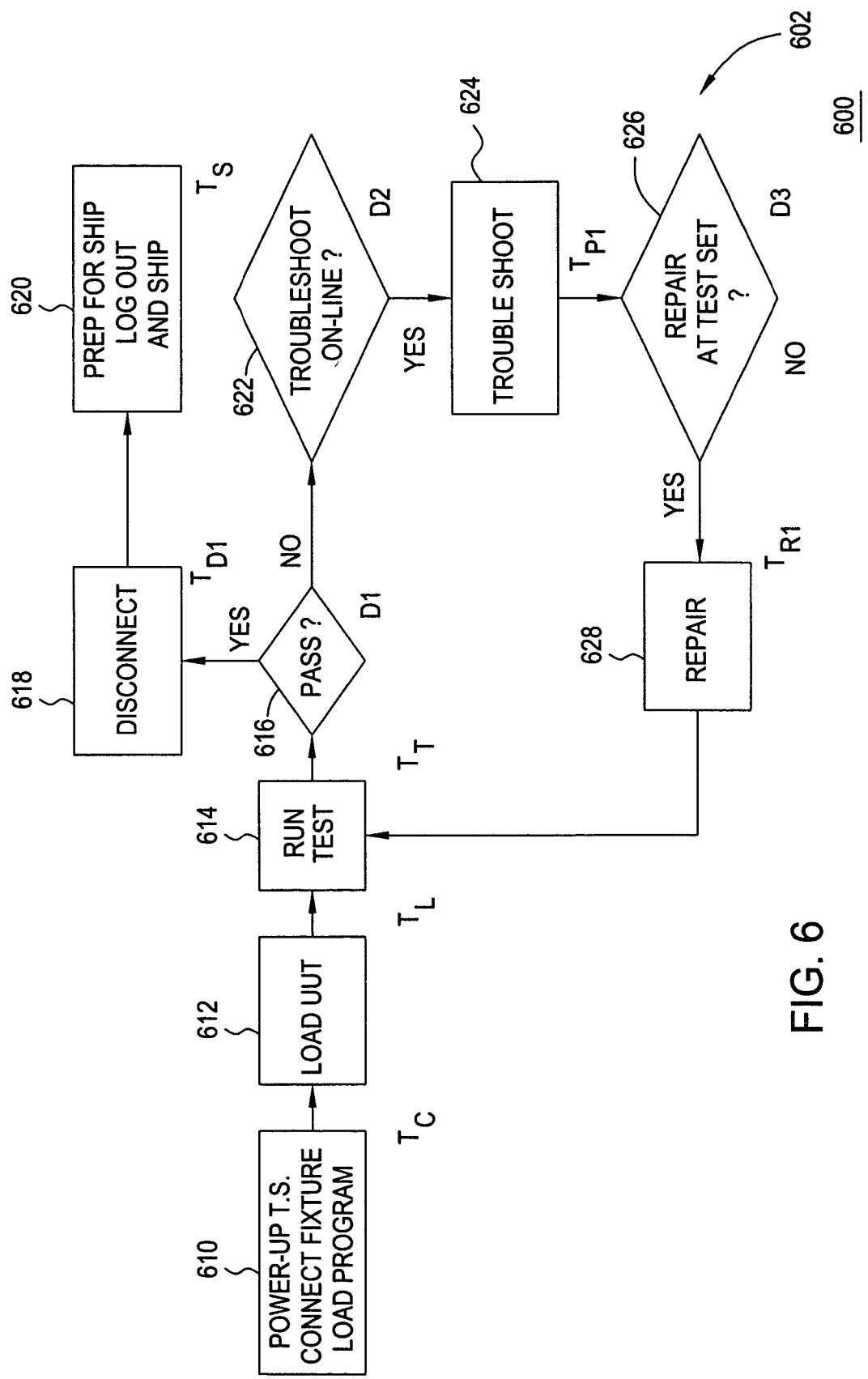
FIG. 6 is a flow diagram of a first subroutine of the method of FIG. 2.

FIG. 6 is a flow diagram 600 of a first subroutine 602 according to the method 200 of FIG. 2. Recall that Equation (6) provides that the average test time $$\overline{T} = T_G + (P_C T_G + T_{PR}) \times \left(\frac{1 - Y_F}{Y_R}\right).$$

Referring to FIG. 6, the subroutine 602 divides the test time $T_G$ into the various components. At 610, $T_C$ is the time interval to set up the test system and get it prepared to perform the product testing. Such preparation may include power up the test system, connecting any associated fixtures, loading applicable programs, and the like. The test system preparation does not need to be done separately for each unit tested, but may be performed, illustratively, for each lot of product tested. At 612, $T_L$ represents the time to connect (load) the product (unit under test (UUT) to the test system. For some products this time may be significant, depending on the complexity of the product (e.g., numerous I/O ports, multifunctional properties of the products, among other test related requirements). At 614, $T_T$ represents the time it takes to test a good unit once it is connected to the test system.

At 616, a determination is made whether the UUT passes the testing. Specifically, a determination is made whether the product passed the test. For an individual product, this is a binary decision, i.e., yes or no. For the more general case, it is the product yield, i.e., the proportion of units that passed test. The subroutine 602 proceeds to 618, where the good UUT is disconnected. Disconnecting the UUT from the test equipment consumes a first disconnect time $T_{D1}$, and like the load time $T_L$, is also dependent on the complexity of the product.

At 620, the UUT is prepared for shipping, logging out, and shipped, which consumes a shipping time $T_S$. The additional disconnecting and shipping times $T_D$ and $T_S$ after the unit passes test, allows for identifying operations that may consume test system capacity that may normally be missed by the prior art techniques. Depending on the situation, the disconnecting and shipping operations may both be performed by the test system operator or they may be split. For example, the test system operator may perform the disconnecting operation of the UUT, while another operator performs the post-test shipping preparations. If there are no units scrapped then each unit will incur these two times.

If at 616, the UUT does not pass product testing, the defective UUT undergoes the troubleshooting and repair operation as discussed above. In particular, the troubleshooting and repair time $T_{PR}$ has been broken into two significant concerns. At 624, $T_P$ represents the time interval required to perform troubleshooting (diagnostics), while 628 represents the time interval required to perform the repair $T_R$. For the subroutine 600 of FIG. 6, $T_{P1}$ represents the time interval required to perform on-line troubleshooting (diagnostics), while 628 represents the time interval required to perform on-line repairs $T_{R1}$ of the failed unit.

Looking at the average test time, the relationships described above may be substituted into Equation (6) by making an assumption that the average lot size equals n. Thus, the Average Test Time is modified to:

$$\overline{T} = \left(\frac{T_C}{n}\right) + T_L + T_T + (P_C T_T + T_{P1} + T_{R1}) \times \left(\frac{1 - Y_F}{Y_R}\right) + T_{D1} + T_S. \quad (17)$$

One skilled in the art will appreciate that Equations (7–16) may also be modified in view of Equation (17). For example, the average troubleshooting/repair and retest cost $C_{\$T}$ added to each product under subroutine 602 is:

$$\text{Cost/unit} = C_{\$T} \times \left(\overline{T}_A - \left(\frac{T_C}{n} + T_L + T_T + T_{D1} + T_S\right)\right).$$

A change in the good test time is given by:

$$\Delta \overline{T}_A = \left(1 - P_C\left(\frac{1 - Y_F}{Y_R}\right)\right) \times \Delta T_T.$$

A change in the troubleshoot time is given by:

$$\Delta \overline{T}_A = \left(\frac{1 - Y_F}{Y_R}\right) \times \Delta T_{P1}.$$

A change in the repair time is given by:

$$\Delta \overline{T}_A = \left(\frac{1 - Y_F}{Y_R}\right) \times \Delta T_{R1}.$$

A change in yield is given by:

$$\Delta \overline{T}_A = -\frac{(P_C T_T + T_{P1} + T_{R1})}{Y_R} \times \Delta Y_F,$$

$$\text{and } \Delta \overline{T}_A = -(P_C T_T + T_{P1} + T_{R1})(1 - Y_F) \times \frac{Y_{R2} - Y_{R1}}{Y_{R2} \times Y_{R1}}.$$

Recalling the basic assumption that the test system is the bottleneck for throughput of a finished product and that the goal is to maximize its utilization, the revised model under Equation (17) may be separated into activities that must be performed on the test system, to those activities that may or may not be performed at the test system. The time values $T_C$, $T_L$, $T_T$, and $T_D$ are all related to the test system and must be done at the test system. However, the times associated with other operations, such as troubleshooting $T_P$, repair $T_R$, and shipping $T_S$, have various options, depending on the product and technology.

One option to consider is whether to perform the troubleshooting of failed units on the test system. Troubleshooting may consume large amounts of time and significantly reduce capacity if performed on the test system. On the other hand, a separate test facility may be used to perform the troubleshooting, and in most cases it will be substantially less expensive than the system test set. If not, the economics must be reviewed very carefully.

A second option is whether to perform the repair of the product at the point where the diagnosis (troubleshooting) of the problems occur. Repairs may be performed at the test system or at a troubleshooting facility. Performing the repair at the test system location consumes capacity of higher priced assets. In addition, there may be technical or practical reasons for performing the repair at a separate location (e.g., troubleshooting facility).

FIG. 6 represents the subroutine 602 of FIG. 2 where the troubleshooting is performed on-line and the repair is also performed on-line at the test set. Specifically, at 616, if the UUT does not pass testing, the subroutine 602 proceeds to 622. At 622, a determination is made whether to troubleshoot on-line. That is, a determination is made whether the failing UUT is troubleshot at the current test system (on-line). For an individual unit, the decision is binary, i.e., yes or no. For the more general case, this may be a proportion of the units that are troubleshot at the test system. If the determination is negatively answered, the subroutine 602 proceeds to subroutine 802, as discussed below in further detail.

If at 622, the determination is affirmatively answered, then the subroutine 602 proceeds to 624, where the failed UUT undergoes diagnostics to identify the failure. Once troubleshooting is complete, at 626, a determination is made whether to repair at the test set. If the determination is negatively answered, the subroutine 602 proceeds to subroutine 702, as discussed below in further detail.

If at 626, the determination is affirmatively answered, then the subroutine 602 proceeds to 628, where the failed UUT is repaired. That is, a determination is made whether the repair work will be performed at the test system. For an individual unit this is a binary decision, i.e., yes or no. In general this can represent the proportion of units that are repaired at the test system. Once the repair is complete, the subroutine returns to 614 where the repaired UUT is retested, and subroutine 602 is repeated until the UUT passes testing at 616.

Figure 7:
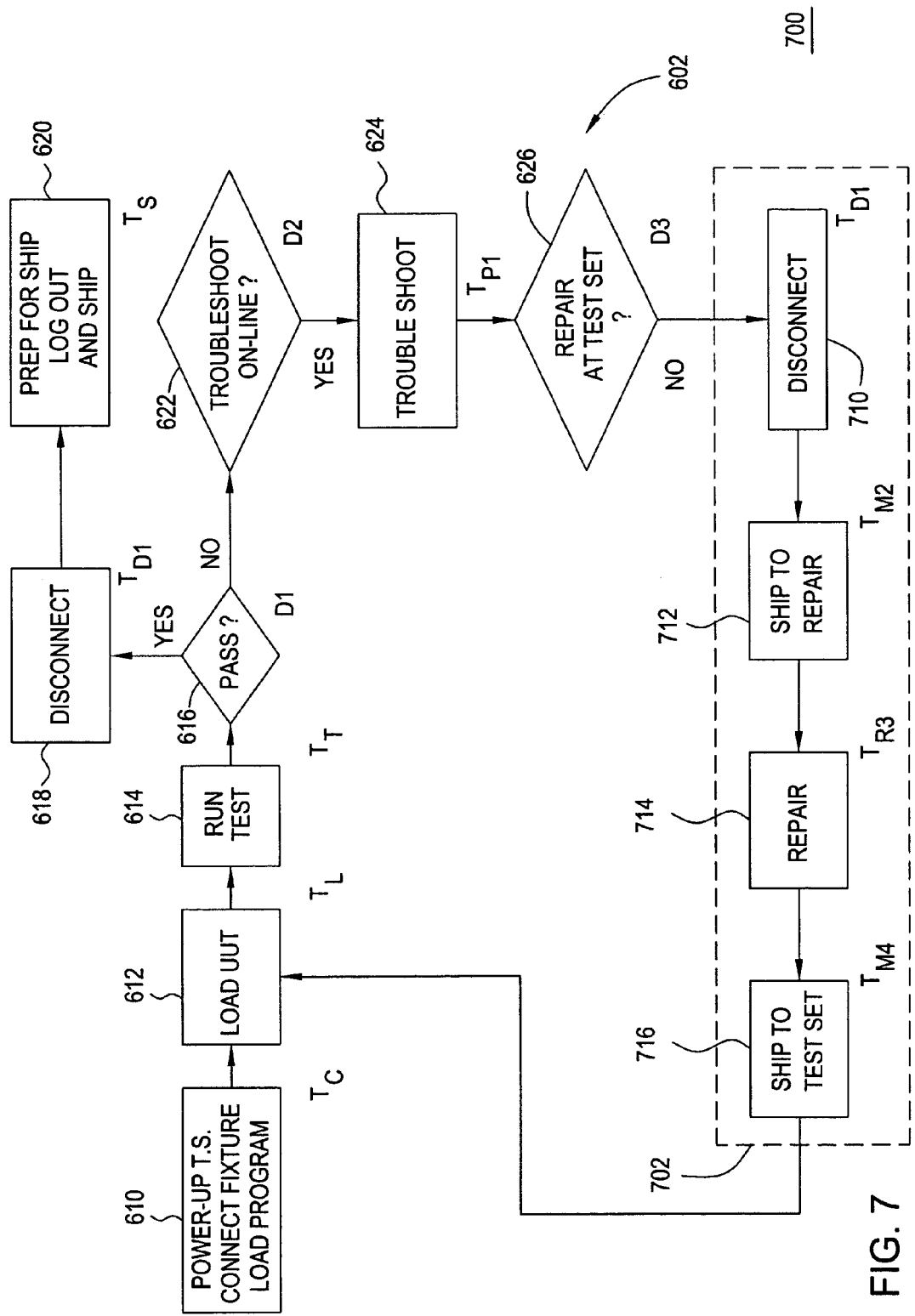
FIG. 7 is a flow diagram of a second subroutine of the method of FIG. 2.

FIG. 7 is a flow diagram 700 of a second subroutine 702 according to method 200 of FIG. 2. The flow diagram 700 includes steps 610–626 of subroutine 602, except at 626, a determination is made that the repair is not being performed at the current test set (i.e., repairs are made off-line). That is, subroutine 702 provides for on-line troubleshooting at the current test set, but off-line repairs. This means at 626, if the determination whether to make the repair at the test set is negatively answered, the subroutine proceeds to 710, where the failed UUT is disconnected. The time associated with disconnecting the UUT from the test on-line troubleshooting equipment is $T_{D1}$, as discussed above with step 618 of subroutine 602. At 712, the failed UUT is shipped to a repair facility. The time $T_{M2}$ associated with moving (e.g., shipping) the failed UUT to a workstation at a repair facility depends on numerous transportation and handling requirements, such as size, packaging requirements, test set location, among other shipping and handling requirements. It is noted that the off-line test set may be located within the same repair facility as where troubleshooting occurs or at another location. The only qualification is that the offline repairs are not performed on a test set that was used to run the first test of the final product.

At 714, the failed UUT is repaired, and at 716, the repaired UUT is shipped back to the test set. The time associated with repairing the UUT at a workstation is $T_{R3}$, while the time for moving (e.g., shipping) the repaired UUT from the workstation back to the test set is $T_{M4}$. As noted above, the repair time is dependent on the type of product and skill level of the persons making such repairs. The shipping time back to the test set is dependent on various shipping and handling factors (location, size, packaging requirement, among other factors), as discussed above. Once the repaired UUT is shipped back to the test set, subroutine 602 is performed such that at 612, the repaired UUT is loaded onto the test set, at 614, the repaired UUT is retested, and if it passes retest, is shipped at 620. Otherwise, if the UUT fails retest, subroutine 702 is repeated, as discussed above.

Adapting Equation (17) for subroutine 702, the average test time may be expressed as:

$$\overline{T}_A = \frac{T_C}{n} + T_L + T_T + (P_C T_T + T_{P1} + T_{D1} + T_L) \times \left(\frac{1-Y_F}{Y_R}\right) + T_{D1}. \quad (18)$$

The average product test time is:

$$\overline{T}_B = \frac{T_C}{n} + T_L + T_T + \quad (19)$$
$$(P_C T_T + T_{P1} + T_{D1} + T_{M2} + T_{R3} + T_{M4} + T_L) \times \left(\frac{1-Y_F}{Y_R}\right) +$$
$$T_{D1} + T_S.$$

The average troubleshooting/repair and retest cost added to each product is, $$\text{Cost/unit} = C_{\$T} \times \left(\overline{T}_B \left(\frac{T_C}{n} + T_L + T_T + T_{D1} + T_S\right)\right).$$

The troubleshooting, repair, and retest (TS&R) cost is a part of the average cost to test a unit. This TS&R cost can be a significant part of the total cost if the yield is low or if the ability to diagnose and repair failures is poor (large $T_{P1}$, or $T_{R3}$).

A change in average test time caused by a change in the good test time is given by:

$$\Delta \overline{T}_A = \Delta \overline{T}_B = \left(1 - P_C \left(\frac{1-Y_F}{Y_R}\right)\right) \times \Delta T_T.$$

A change in average test time caused by a change in the troubleshoot time is given by:

$$\Delta \overline{T}_A = \Delta \overline{T}_B = \left(\frac{1-Y_F}{Y_R}\right) \times \Delta T_{P1}.$$

A change in average test time caused by a change in the repair time is given by:

$$\Delta \overline{T}_A = 0, \Delta \overline{T}_B = \left(\frac{1-Y_F}{Y_R}\right) \times \Delta T_{R3}.$$

A change in average test time caused by a change in yield is given by:

$$\Delta \overline{T}_A = -\frac{(P_C T_T + T_{P1} + T_{D1} + T_L)}{Y_R} \times \Delta Y_F;$$

$$\Delta \overline{T}_B = -\frac{(P_C T_T + T_{P1} + T_{D1} + T_{M2} + T_{R3} + T_{M4} + T_L)}{Y_R} \times \Delta Y_F;$$

$$\Delta \overline{T} = -(T_T + T_{P1} + T_{D1} + T_{M2} + T_{R3} + T_{M4} + T_L) \times \frac{Y_{R2} - Y_{R1}}{Y_{R2} \times Y_{R1}}; \text{ and}$$

$$\Delta \overline{T} = -(T_T + T_{P1} + T_{D1} + T_{M2} + T_{R3} + T_{M4} + T_L) \times \frac{Y_{R2} - Y_{R1}}{Y_{R2} \times Y_{R1}}.$$

Figure 8:
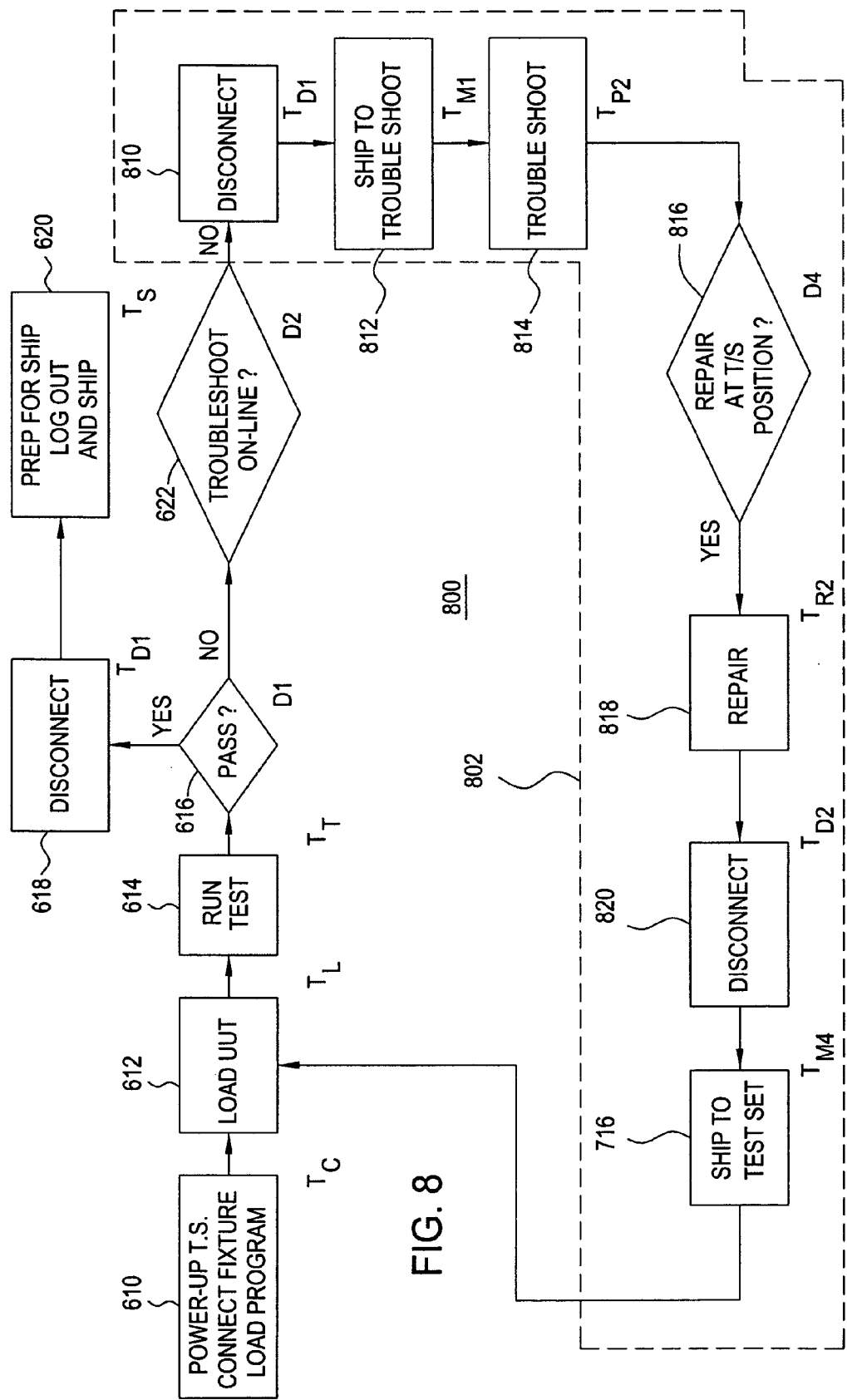
FIG. 8 is a flow diagram of a third subroutine of the method of FIG. 2.

FIG. 8 is a flow diagram 800 of a third subroutine 802 according to method 200 of FIG. 2. Subroutine 802 provides for off-line troubleshooting and on-line repairs. The flow diagram 800 includes steps 610–622 of subroutine 602, except at 622, a determination has been made that troubleshooting is to be performed off-line (i.e., not at the current test set). The subroutine then proceeds to 810 of subroutine 802. At 810, the failed UUT is disconnected in a time of $T_{D1}$, which as discussed above, depends on the complexity of the product and test equipment. The subroutine 802 then proceeds to 812.

At 812, the failed UUT is transported (e.g., packed and shipped) to a troubleshooting facility. The troubleshooting facility may be located at the manufacturing and assembly facility 100 or other locations (e.g., a vendor). The time associated with moving (e.g., shipping) $T_{M1}$ the failed UUT is product dependent, as discussed above with respect to the transportation time $T_{M2}$ when transporting a UUT to a workstation at a repair facility at 712 of subroutine 702. It is noted that the UUT moving times $T_{M1}$ through $T_{M4}$ are denoted as having different transportation (e.g., packed and shipping) times, since the locations of the on-line troubleshooting facilities, and on-line/off-line repair test sets may all be different.

At 814, the failed UUT undergoes troubleshooting. The time $T_{P2}$ associated with off-line troubleshooting may differ from the time $T_{P1}$ for on-line troubleshooting. The troubleshooting time differences may be attributed to, but are not limited to, different types of diagnostics equipment utilized at each location, skill level of the technicians, ability to perform specialized measurements (the system test set may not be as flexible in this regard compared to a troubleshooting station), and the like. Once troubleshooting is complete at 814, subroutine 802 proceeds to 816.

At 816, a determination is made whether repairs are to be performed at the test system position. That is, a determination is made whether the repair work will be performed at the off-line troubleshooting station. For an individual unit this is a binary decision, i.e., yes or no. In general this is the proportion of units that get repaired at the troubleshooting station.

If the determination at 816 is negatively answered, the subroutine 802 proceeds to subroutine 902, as discussed below in further detail. Otherwise, if the determination is affirmatively answered, the subroutine 802 proceeds to 818, where an on-line (i.e., at the same test set) repair is made. The time associated with the on-line repair is $T_{R2}$, as compared to the on-line repair is $T_{R3}$ associated with off-line repairs at a workstation, as discussed with respect to 714 of subroutine 702. The repair time differences may be attributed to, but are not limited to, specialized repair location may have tools to remove and reapply components more efficiently than those at a test or troubleshooting station. In some instances certain components require specialized tools or facilities to remove and reattach them. Once repair action is complete at 818, subroutine 802 proceeds to 820.

At 820, the repaired UUT is disconnected a from the repair equipment. It is noted that the time associated with disconnecting the UUT from the on-line repair is $T_{D2}$. The disconnect time $T_{D2}$ may differ from the disconnect time $T_{D1}$ associated with disconnecting the UUT from the off-line diagnostics equipment, as discussed with respect to 810. The disconnect time differences may be attributed to, but are not limited to differences in types of repair equipment used. It is possible that the number of connections made to the unit under test could differ at the troubleshooting station. For example, if a specific failure mode is known from the testing station, a test operator you might only make a few connections to simulate that one specific test.

Once the repaired UUT has been disconnected, the subroutine 802 proceeds to 716 of subroutine 702, where the repaired UUT is shipped to the test set used for the first product testing. Subroutines 602 and 802 are repeated until the UUT passes retest at 616, and is prepared for shipment at 620 as discussed above.

Adapting Equation (17) for subroutine 802, the average test time may be expressed as:

$$\overline{T}_A = \frac{T_C}{n} + T_L + T_T + (P_C T_T + T_{D1} + T_L) \times \left(\frac{1 - Y_F}{Y_R}\right) + T_{D1}. \quad (20)$$

The average product test time is:

$$\overline{T}_B = \frac{T_C}{n} + T_L + T_T + \quad (21)$$
$$(P_C T_T + T_{P2} + T_{D1} + T_{M1} + T_{R2} + T_{D2} + T_{M4} + T_L) \times \left(\frac{1 - Y_F}{Y_R}\right) +$$
$$T_{D1} + T_S.$$

The average troubleshooting/repair and retest cost added to each product is:

$$\text{Cost/unit} = C_{\$T} \times \left(\overline{T}_B - \left(\frac{T_C}{n} + T_L + T_T + T_{D1} + T_S\right)\right).$$

The change in average test time caused by a change in the good test time is given by:

$$\Delta \overline{T}_A = \Delta \overline{T}_B = \left(1 - P_C\left(\frac{1 - Y_F}{Y_R}\right)\right) \times \Delta T_T.$$

The change in average test time caused by a change in the troubleshoot time is given by:

$$\Delta \overline{T}_A = 0, \Delta \overline{T}_B = \left(\frac{1 - Y_F}{Y_R}\right) \times \Delta T_{P2}.$$

The change in average test time caused by a change in the repair time is given by:

$$\Delta \overline{T}_A = 0, \Delta \overline{T}_B = \left(\frac{1 - Y_F}{Y_R}\right) \times \Delta T_{R2}.$$

The change in average test time caused by a change in yield is given by:

$$\Delta \overline{T}_A = -\frac{(P_C T_T + T_{D1} + T_L)}{Y_R} \times \Delta Y_F;$$

$$\Delta \overline{T}_B = -\frac{(P_C T_T + T_{P2} + T_{D1} + T_{M1} + T_{R2} + T_{D2} + T_{M4} + T_L)}{Y_R} \times \Delta Y_F;$$

$$\Delta \overline{T}_A = -(P_C T_T + T_{D1} + T_L)(1 - Y_F) \times \frac{Y_{R2} - Y_{R1}}{Y_{R2} \times Y_{R1}}; \text{ and}$$

$$\Delta \overline{T}_B = -(P_C T_T + T_{P2} + T_{D1} + T_{M1} + T_{R2} + T_{D2} + T_{M4} + T_L)$$
$$(1 - Y_F) \times \frac{Y_{R2} - Y_{R1}}{Y_{R2} \times Y_{R1}}.$$

Figure 9:
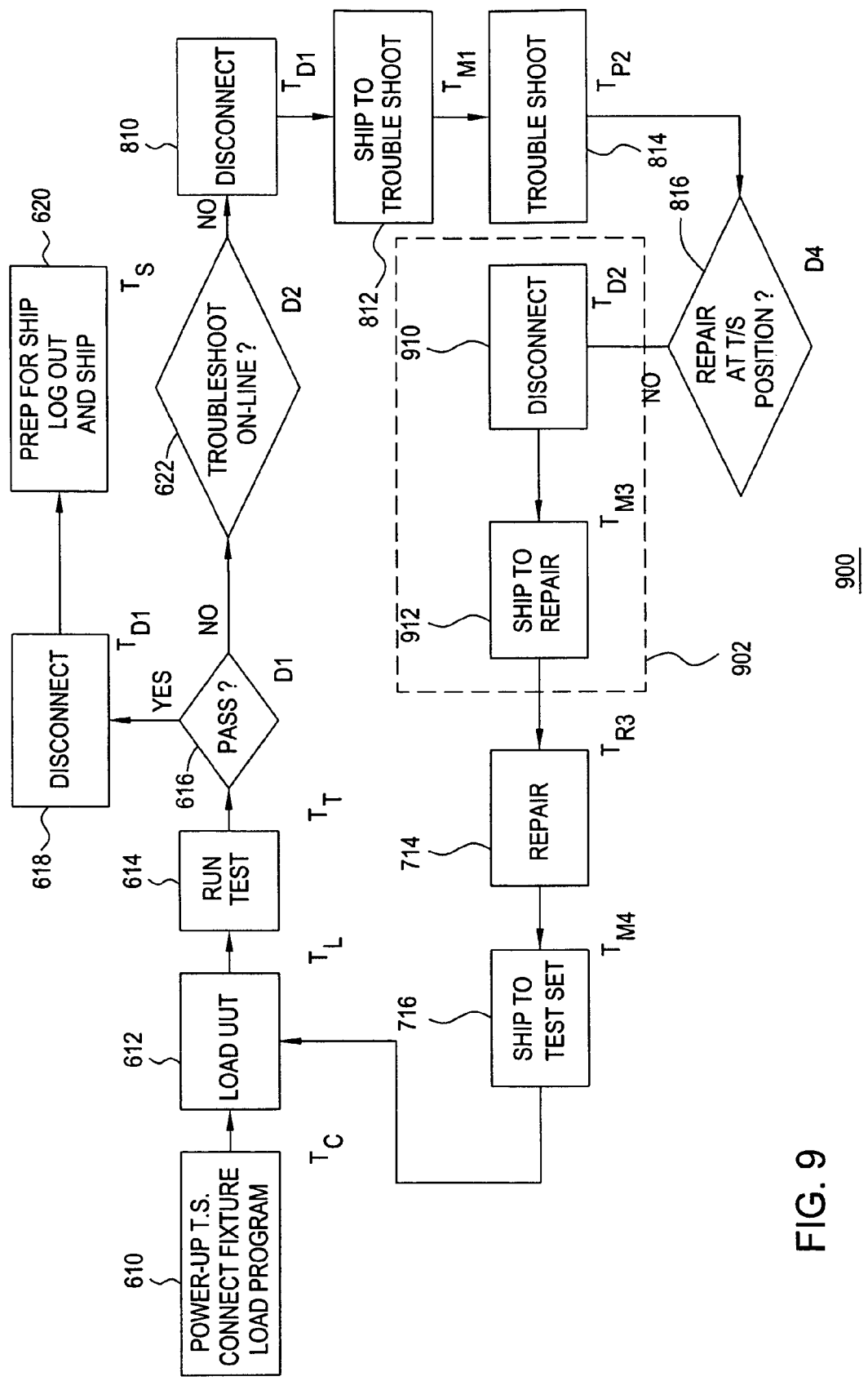
FIG. 9 is a flow diagram of a fourth subroutine of the method of FIG. 2.

FIG. 9 is a flow diagram 900 of a fourth subroutine 902 according to method 200 of FIG. 2. Subroutine 902 provides for off-line troubleshooting and off-line repairs. The flow diagram 900 includes steps 610–622 of subroutine 602, except at 622, a determination was made that troubleshooting is performed off-line (i.e., not at the test set equipment used for the first test). Further, subroutine 902 proceeds to and includes 810–816 of subroutine 802, which represent off-line troubleshooting.

Specifically, at 810, the failed UUT is disconnected in a time of $T_{D1}$, which as discussed above, depends on the complexity of the product and test equipment. At 812, the failed UUT is moved (i.e., transported) to a troubleshooting facility. The moving time $T_{M1}$ associated with transporting the failed UUT is product dependent. As discussed above, the moving times $T_{M1}$ through $T_{M4}$ are denoted as having different times, for example, since the locations of the on-line troubleshooting facilities, and on-line/off-line repair test sets/workstations may all be different.

At 814, the failed UUT undergoes troubleshooting, as discussed above, and once troubleshooting is complete, subroutine 802 proceeds to 816. At 816, a determination is made whether repairs are to be performed at the test system position (on-line). If the determination at 816 affirmatively answered, the subroutine 902 proceeds to 818 of subroutine 802, as discussed above.

If the determination is negatively answered, the subroutine 902 proceeds to 910, where the failed UUT is not repaired at the same test equipment where the troubleshooting equipment is located. At 910, the troubleshot UUT is disconnected from the diagnostics equipment at a time of $T_{D2}$. At 912, the troubleshot UUT is moved (e.g., shipped) for repair to an off-line test system. The time associated with moving a UUT from an on-line test set to a workstation at an off-line test set is $T_{M3}$. As noted above, the off-line test set may be at the same manufacturing and assembly facility 100 or located at another site, such as a vendor site.

The moving time differences between on-line and off-line troubleshooting and/or repair centers may illustratively be attributed to the length of the route taken from the test set or troubleshooting station, which would change the duration of the transit interval. As discussed herein, move time $T_{M1}$ is the time required to move from the test system 104 to the troubleshooting station 107. Move time $T_{M2}$ is the time required to move from the test system 107 to a workstation at the repair station 108. If the troubleshooting station 107 and the repair station 108 are not close to each other, the times would be different. Move time $T_{M3}$ is the time required to move from the troubleshooting station 107 to the repair station 108, which depending on the physical location of the various facilities, could be yet another interval. Lastly, move time $T_{M4}$ is the time required to move from a workstation at the repair station 108 back to the test system 104, and should be a value very close to $T_{M2}$. The move times $T_M$ are kept separate to enhance the generality of the model. Once the troubleshot UUT has been shipped to the off-line repair equipment, subroutine 902 proceeds to 714 where appropriate repairs are made.

Once repairs of the UUT are complete, the subroutine 902 proceeds to 716 of subroutine 702, where the repaired UUT is shipped to the test set for retest. Subroutines 602 and 902 are repeated until the UUT passes retest at 616, and is then prepared for shipment at 620 as discussed above.

Adapting Equation (17) for subroutine 902, the average test time may be expressed as:

$$\bar{T}_A = \frac{T_C}{n} + T_L + T_T + (P_C T_T + T_{D1} + T_L) \times \left(\frac{1-Y_F}{Y_R}\right) + T_{D1}. \quad (22)$$

The average product test time is:

$$\bar{T}_B = \frac{T_C}{n} + T_L + T_T + \quad (23)$$
$$(P_C T_T + T_{P2} + T_{D1} + T_{M1} + T_{R3} + T_{M3} + T_{D2} + T_{M4} + T_L) \times$$
$$\left(\frac{1-Y_F}{Y_R}\right) + T_{D1} + T_S.$$

The average troubleshooting/repair and retest cost added to each product is:

$$\text{Cost/unit} = C_{\$T} \times \left(\bar{T}_B - \left(\frac{T_C}{n} + T_L + T_T + T_{D1} + T_S\right)\right).$$

The change in average test time caused by a change in the good test time is given by:

$$\Delta \bar{T}_A = \Delta \bar{T}_B = \left(1 + P_C\left(\frac{1-Y_F}{Y_R}\right)\right) \times \Delta T_T.$$

The change in average test time caused by a change in the troubleshoot time is given by:

$$\Delta \bar{T}_A = 0, \Delta \bar{T}_B = \left(\frac{1-Y_F}{Y_R}\right) \times \Delta T_{P2}.$$

The change in average test time caused by a change in the repair time is given by:

$$\Delta \bar{T}_A = 0, \Delta \bar{T}_B = \left(\frac{1-Y_F}{Y_R}\right) \times \Delta T_{R3}.$$

The change in average test time caused by a change in yield is given by:

$$\Delta \bar{T}_A = -\frac{(P_C T_T + T_{D1} + T_L)}{Y_R} \times \Delta Y_F;$$

$$\Delta \bar{T}_B =$$
$$-\frac{(P_C T_T + T_{P2} + T_{D1} + T_{M1} + T_{R3} + T_{M3} + T_{D2} + T_{M4} + T_L)}{Y_R} \times \Delta Y_F;$$

$$\Delta \bar{T}_A = -(P_C T_T + T_{D1} + T_L)(1 - Y_F) \times \frac{Y_{R2} - Y_{R1}}{Y_{R2} \times Y_{R1}}; \text{and}$$

$$\Delta \bar{T}_B = -(T_T + T_{P2} + T_{D1} + T_{M1} + T_{R3} + T_{M3} + T_{D2} + T_{M4} + T_L)$$
$$(1 - Y_F) \times \frac{Y_{R2} - Y_{R1}}{Y_{R2} \times Y_{R1}}.$$

Thus, the subroutines 602, 702, 802, and 902 form method 200 of FIG. 2. Referring to method 200 of FIG. 2, to generalize the process model it is assumed that the decision points are not fixed. Rather, it is assumed that the decision is the proportion of times a particular path is taken. That is, depending on the circumstance of the failure, a test manager may choose to perform the troubleshooting on-line in some instances, and off-line (at the troubleshooting station) at other times. If the facility 100 is running high volume and high yields, a test manager might send all failures to a separate troubleshooting station so as not to slow down the throughput on a high speed line. Also, minor repairs, such as a loose connection or a cable that has been connected to the wrong location causes the failure, these minor repairs would most likely be made at the test system, where testing could continue immediately thereafter. If a major sub assembly needed to be replaced, a manager may deem it better to send the failed sub assembly to an off-line repair position. Because you have several options that may be exercised independently from one UUT to the next, the decision points are not binary, but truly become proportions (i.e., what proportion of the time do you troubleshoot at the test set, or what proportion of the time do you repair at the test set. It is noted that the effect of having different yields at first test and retest is also included.

In one embodiment of the invention, a computer readable medium stores the instructions The resulting set of equations enable effective management of the test process and the resources consumed. The average time at the test system is:

$$\bar{T}_A = \frac{T_C}{n} + T_L + T_T + T_{D1} + \quad (24)$$

-continued $$\left(\frac{1-Y_F}{Y_R}\right) \times [P_C T_T + L_2(T_{P1} + L_3 T_{R1} + (1-L_3)(T_{D1} + T_L)) +$$
$$(1-L_2)(T_{D1} + T_L)] + L_2 L_3 T_S.$$

The average product test time is:

$$\overline{T}_B = \tag{25}$$
$$\frac{T_C}{n} + T_L + T_T + T_{D1} + T_S + \left(\frac{1-Y_F}{Y_R}\right)[L_2(P_C T_T + T_{P1} + L_3(T_{R1}) +$$
$$(1-L_3)(T_{D1} + T_{M2} + T_{R3} + T_{M4} + T_L)) +$$
$$(1-L_2)(P_C T_T + T_{P2} + T_{D1} + T_{M1} + T_{D2} + T_{M4} +$$
$$T_L + L_4(T_{R2}) + (1-D_4)(T_{R3} + T_{M3}))].$$

Referring to FIG. 2, it is noted that $L_1$ represents a proportion (percentage) of units under test that passed testing at the online test set, and $L_2$ represents a proportion (percentage) of units under test that are troubleshot at the online test set. Additionally, $L_3$ represents a proportion (percentage) of units under test that are repaired at the online test set, while $L_4$ represents a proportion (percentage) of units under test that are repaired at an off-line troubleshooting station.

Equation (24) provides the average amount of time a product will spend on the test system (i.e., the time the resource is tied up). Equation (24) is useful for performing capacity and utilization calculations. Equation (25) provides for the average amount of time a product spends in the test process. Equation (25) is useful in assessing throughput and scheduling the operation. The fundamental difference between these two equations is where the troubleshooting and repair operations are performed. By experimenting with Equations (24) and (25), a tradeoff may be observed between test system capacity consumed versus the throughput for the product. The more that is offloaded from the test system to improve capacity, the longer the average time it takes to get the product through the process.

To make an objective assessment among the alternatives, the average time at each of the other workstations is provided below in Equations (26) through Equation (29). Since each product flows through the shipping operation once, the average time at the shipping operation is:

$$T_S = T_S. \tag{26}$$

For the troubleshooting operation, the time at an independent troubleshooting station is only considered. The time spent troubleshooting at the test system is already included in the $T_A$ calculation. The average time to repair is:

$$\overline{T}_{TR} = (1-L_2)\left(\frac{1-Y_F}{Y_R}\right)(T_{P2} + T_{D2} + L_4 T_{R2}). \tag{27}$$

The average time at the repair position is given by:

$$\overline{T}_R = \left(\frac{1-Y_F}{Y_R}\right) T_{R3}(L_2(1-L_3) + (1-L_2)(1-L_4)). \tag{28}$$

The average time at the move operation is given by:

$$\overline{T}_M = \left(\frac{1-Y_F}{Y_R}\right) \tag{29}$$
$$(L_2(1-L_3)(T_{M2} + T_{M4}) + (1-L_2)(T_{M1} + T_{M4} + (1-L_4)T_{M3})),$$

where the "move operation" is a generalized reference to the composite of $T_{M1}$, $T_{M2}$, $T_{M3}$, & $T_{M4}$. If you have specialized labor is required for performing this operation, Equation (29) will be used to estimate the amount of resources that are required.

The analysis of the change in average time consumed at the test system yields the following: the change in average test time $T_A$ caused by a change in the good test time is given by:

$$\Delta \overline{T}_A = \left(1 + P_C\left(\frac{1-Y_F}{Y_R}\right)\right) \times \Delta T_T. \tag{30}$$

The change in average test time $T_A$ caused by a change in the troubleshoot time is given by:

$$\Delta \overline{T}_A = \left(\frac{1-Y_F}{Y_R}\right) L_2 \times \Delta T_{P1}. \tag{31}$$

The change in average test time $T_A$ caused by a change in the repair time is given by:

$$\Delta \overline{T}_A = \left(\frac{1-Y_F}{Y_R}\right) L_2 L_3 \times \Delta T_{R1}. \tag{32}$$

The change in average test time $T_A$ caused by a change in first test yield is given by:

$$\Delta \overline{T}_A = -(P_C T_T + L_2(T_{P1} + L_3 T_{R1} + (1-L_3)(T_{D1} + T_L)) + (1-L_2)(T_{D1} + T_L)) \times \Delta Y_F. \tag{33}$$

The change in average test time $T_A$ caused by a change in retest yield is given by:

$$\Delta \overline{T}_A = -\left(\begin{array}{c}(P_C T_T + L_2(T_{P1} + L_3 T_{R1} + (1-L_3)(T_{D1} + T_L)) + \\ (1-L_2)(T_{D1} + T_L)\end{array}\right) \tag{34}$$
$$(1-Y_F)\left(\frac{Y_{R2} - Y_{R1}}{Y_{R2} Y_{R1}}\right).$$

Changes in these parameters affect the average product test time as follows. The change in average product test time $T_B$ caused by a change in the good test time is given by:

$$\Delta \overline{T}_B = \left(1 + P_C\left(\frac{1-Y_F}{Y_R}\right)\right) \times \Delta T_T, \tag{35}$$

where $T_B$ id the average time that a product spends in the entire test process. This is the throughput affecting time for the product.

The change in average product test time $T_B$ caused by a change in the troubleshoot time is given by:

$$\Delta \overline{T}_B = \left(\frac{1-Y_F}{Y_R}\right) L_2 \times \Delta T_{P1}; \quad (36)$$

$$\Delta \overline{T}_B = \left(\frac{1-Y_F}{Y_R}\right) (1-L_2) \times \Delta T_{P2} \quad (37)$$

The change in average product test time $T_B$ caused by a change in the repair time is given by:

$$\Delta \overline{T}_B = \left(\frac{1-Y_F}{Y_R}\right) L_2 L_3 \times \Delta T_{R1} \quad (38)$$

$$\Delta \overline{T}_B = \left(\frac{1-Y_F}{Y_R}\right) (1-L_2) L_4 \times \Delta T_{R2} \quad (39)$$

$$\Delta \overline{T}_B = \left(\frac{1-Y_F}{Y_R}\right) (L_2(1-L_3) + (1-L_2)(1-L_4)) \times \Delta T_{R3} \quad (40)$$

The change in average product test time $T_B$ caused by a change in first test yield is given by:

$$\Delta \overline{T}_B = -\begin{bmatrix} L_2(P_C T_T + T_{P1} + L_3 T_{R1} + \\ (1-L_3)(T_{D1} + T_{M2} + T_{R3} + T_{M4} + T_L)) + \\ (1-L_2)\begin{pmatrix} P_C T_T + T_{P2} + T_{D1} + T_{M1} + \\ T_{D2} + T_{M4} + T_L + L_4 T_{R2} + \\ (1-L_4)(T_{R3} + T_{M3}) \end{pmatrix} \end{bmatrix} \Delta Y_F \quad (41)$$

The change in average product test time $T_B$ caused by a change in retest yield is given by:

$$\Delta \overline{T}_B = -\begin{bmatrix} L_2\begin{pmatrix} P_C T_T + T_{P1} + L_3 T_{R1} + [(1-L_3) \\ (T_{D1} + T_{M2} + T_{R3} + T_{M4} + T_L)] \end{pmatrix} + \\ (1-L_2)\begin{pmatrix} P_C T_T + T_{P2} + T_{D1} + T_{M1} + T_{D2} + T_{M4} + \\ T_L + L_4 T_{R2} + (1-L_4)(T_{R3} + T_{M3}) \end{pmatrix} \end{bmatrix} \quad (42)$$

$$(1-Y_F)\left(\frac{Y_{R2} - Y_{R1}}{Y_{R2} Y_{R1}}\right)$$

The present invention overcomes the deficiencies of the prior art by accounting for the possible (and most probable) differences between test yield occurring during initial (first) testing and test yields after troubleshooting and repair have occurred. Accordingly, the present invention provides a more accurate method of planning the amount of time (i.e., the average test time) it takes during test operations.

The present invention may be implemented by one or more controllers 120 that are in communication with the test operations 102. Although not shown in FIG. 1, historical databases may be utilized to collect trend data to provide actual times associated with preparing a test station for test ($T_C$), loading a unit under test ($T_L$), performing the actual diagnostics ($T_F$), performing the actual repairs ($T_R$), disconnecting the UUT after troubleshooting and/or repairs are complete ($T_D$), and shipping operations ($T_S$).

Further distinctions may be made as between performing on-line troubleshooting at the current test equipment, and off-line troubleshooting at the other diagnostic/test equipment. It has been shown that the times associated between on-line and off-line troubleshooting may vary significantly, depending on the type, location, and capabilities of the off-line equipment, as compared to the on-line test set equipment.

A similar analysis is also applicable to the repair test set. That is, the times associated between on-line and off-line repairs may vary significantly, depending on the type, location, and capabilities of the off-line test set equipment, as compared to the on-line test set equipment.

The at least one controller of the present invention is able to accurately predict the average test time to perform the test operations for finished product created by a manufacturing and assembly facility 100. The basic models defined by Equations (4), (5), and (6), and more sophisticated models of Equations (41) and (42) enable test operation planners to more accurately determine their equipment requirements, staffing needs, and how to better allocate resources (e.g., capital resources) to improve product throughput during test operations, than the current models and estimates used today.

Although various embodiments that incorporate the teachings of the present invention have been shown and described in detail herein, those skilled in the art can readily devise many other varied embodiments that still incorporate these teachings.

What is claimed is:

1. A method of establishing an average test time ($T_A$), comprising:
   determining a first time interval ($T_G$) nominally associated with non-failing testing of a unit under test (UUT);
   determining a second time interval ($T_{PR}$) nominally associated with troubleshooting and repairing a failed unit under test;
   determining a percent yield (Y) nominally associated with a proportion of non-failing units under test, wherein said average test time ($T_A$) is defined as $T_A = T_G + (T_G + T_{PR})((1-Y)/Y))$.

2. The method of claim 1, wherein said determining said percent yield (Y) further comprises:
   determining a first yield ($Y_F$) associated with units of said product passing where no failures occurring during said testing; and
   determining a second yield ($Y_R$) associated with units of said product passing retest after failing initial testing.

3. The method of claim 2, wherein said total average test time is $T_A = T_G + (T_G + T_{PR})((1-Y_F)/Y_R))$.

4. The method of claim 3, further comprising:
   determining a percent of test that is completed ($P_C$) prior to termination from a test failure, said average test time being $T_A = T_G + (P_C T_G + T_{PR})((1-Y_F)/Y_R)$.

5. The method of claim 4, further comprising:
   determining a number of test systems required to perform said testing, said number of test systems required being $QT_A/T_{SA}$, wherein Q represent a number of units being tested and $T_{SA}$ represents a time a test asset is available within an allotted time period.

6. The method of claim 4, further comprising:
   determining staffing levels required to perform said testing, wherein said staffing levels required is $QT_A/T_{AA}$, wherein Q represent a number of units being tested and $T_{AA}$ represents a time each staff member is available within an allotted time period.

7. The method of claim 4, further comprising:
   determining average cost per unit, where said average cost per unit is a product of cost per unit ($C_{\$T}$) and said total average test time ($T_A$).

8. The method of claim 7, further comprising:
determining average cost per unit for troubleshooting, repair, and retest, where said average cost per unit for troubleshooting, repair, and retest is $(C_{\$T})(T_A-T_G)$.

9. The method of claim 4, further comprising:
determining a change in average test time caused by a change in said first time interval associated with testing a unit under test where no failures occur during said testing, where said change in average test time is $$\Delta \overline{T} = \left(1 + P_C\left(\frac{1-Y_F}{Y_R}\right)\right) \times \Delta T_G.$$

10. The method of claim 4, further comprising:
determining a change in average test time caused by a change in said second time interval associated with testing a repaired unit under test during said testing, where said change in average test time is $$\Delta \overline{T} = \left(\frac{1-Y_F}{Y_R}\right) \times \Delta T_{PR}.$$

11. The method of claim 4, further comprising:
determining a change in average test time caused by a change in said first yield ($Y_F$), where said change in average test time is $$\Delta \overline{T} = -\frac{(P_C T_G + T_{PR})}{Y_R} \times \Delta Y_F.$$

12. The method of claim 4, further comprising:
determining a change in average test time caused by a change in said second yield ($Y_R$), where said change in average test time is $$\Delta \overline{T} = -(P_C T_G + T_{PR})(1-Y_F) \times \frac{Y_{R2} - Y_{R1}}{Y_{R2} \times Y_{R1}}.$$

13. The method of claim 4, further comprising:
determining percent of utilization of said test, where said percent of $$\text{Utilization} = \frac{Q \times \overline{T}}{N_S \times T_{SA}} \times 100\%.$$

14. The method of claim 4, wherein determining said first time interval $T_G$ comprises:
determining a load time component $T_L$ associated with loading a unit under test to a test set;
determining a test time component $T_T$ associated with testing said unit under test; and
determining a time interval $T_C$ to prepare a test system for performing product testing.

15. The method of claim 14, wherein determining said second time interval $T_{PR}$ comprises:
determining a troubleshooting time component $T_P$ associated with troubleshooting a defective unit under test;
determining a repair time component $T_R$ associated with repairing said defective unit under test for a particular test set; and determining a disconnect time component $T_D$ associated with disconnecting said unit under test from said test set.

16. The method of claim 15, wherein:
said determining a troubleshooting time component comprises determining a time interval $T_{P1}$ associated with performing on-line troubleshooting at a test set where testing of said UUT was performed;
said determining a repair time component comprises determining a time interval $T_{R1}$ associated with performing on-line repairs at said test set where testing of said UUT was performed; and
said determining a disconnect time component comprises determining a time interval $T_{D1}$ associated with disconnecting said unit under test from said on-line test set.

17. The method of claim 16, wherein said average test time $T_A$ is:

$$\overline{T_A} = \left(\frac{T_C}{n}\right) + T_L + T_T + (P_C T_T + T_{P1} + T_{R1}) \times \left(\frac{1-Y_F}{Y_R}\right) + T_{D1} + T_S,$$

where n represents an average lot size of said product, and $T_S$ is a time interval to transport said unit under test after testing is performed.

18. The method of claim 15, wherein:
said determining a troubleshooting time component comprises determining a time interval $T_{P1}$ associated with performing on-line troubleshooting at a test set where testing of said UUT was performed;
said determining a repair time component comprises determining a time interval $T_{R3}$ associated with performing off-line repairs at a workstation that is different from where troubleshooting of said UUT was performed; and
said determining a disconnect time component comprises determining a time interval $T_{D1}$ associated with disconnecting said unit under test from said on-line test set where said testing of said UUT was performed.

19. The method of claim 18, wherein said average test time $T_A$ is:

$$\overline{T_A} = \left(\frac{T_C}{n}\right) + T_L + T_T + (P_C T_T + T_{P1} + T_{D1} + T_L) \times \left(\frac{1-Y_F}{Y_R}\right) + T_{D1},$$

where n represents an average lot size of said product.

20. The method of claim 18, further comprising:
determining a move time interval ($M_2$) associated with transferring a failed UUT from said test set associated with performing online troubleshooting of said UUT, to an off-line repair facility; and
determining a move time interval ($M_4$) associated with time to transfer a repaired UUT from said workstation associated with off-line repair to said test set associated with performing online testing of said UUT.

21. The method of claim 20, further comprising:
determining an average product test time $T_B$, said average product test time being defined as:

$$\overline{T_B} = \frac{T_C}{n} + T_L + T_T +$$
$$(P_C T_T + T_{P1} + T_{D1} + T_{M2} + T_{R3} + T_{M4} + T_L) \times \left(\frac{1-Y_F}{Y_R}\right) + T_{D1} + T_S,$$

where n represents an average lot size of said product, and $T_S$ is a time interval to transport said unit under test after testing is performed.

22. The method of claim 15, wherein:
said determining a troubleshooting time component comprises determining a time interval $T_{P2}$ associated with performing troubleshooting at a test set that is off-line from where testing of said UUT was performed;
said determining a repair time component comprises determining a time interval $T_{R2}$ associated with performing on-line repairs at said off-line test set;
said determining a disconnect time component comprises determining a first time interval $T_{D1}$ associated with disconnecting said unit under test from said on-line test set where said testing of said UUT was performed; and
said determining a disconnect time component comprises determining a second time interval $T_{D2}$ associated with disconnecting said unit under test from said test set where said off-line troubleshooting of said UUT was performed.

23. The method of claim 22, wherein said average test time $T_A$ is:

$$\overline{T_A} = \left(\frac{T_C}{n}\right) + T_L + T_T + (P_C T_T + T_{D1} + T_L) \times \left(\frac{1 - Y_F}{Y_R}\right) + T_{D1},$$

where n represents an average lot size of said product.

24. The method of claim 22, further comprising:
determining a move time interval ($M_1$) associated with transferring a failed UUT from said test set associated with performing on-line testing of said UUT, to a test set associated with performing off-line troubleshooting of said UUT; and
determining a move time interval ($M_4$) associated with transferring a repaired UUT from a test set associated with performing off-line troubleshooting with on-line repair of said UUT, to said test set associated with performing online testing of said UUT.

25. The method of claim 24, further comprising:
determining an average product test time $T_B$, said average product test time being defined as:

$$\overline{T_B} = \frac{T_C}{n} + T_L + T_T +$$
$$(P_C T_T + T_{P2} + T_{D1} + T_{M1} + T_{R2} + T_{D2} + T_{M4} + T_L) \times \left(\frac{1 - Y_F}{Y_R}\right) +$$
$$T_{D1} + T_S,$$

where n represents an average lot size of said product, and $T_S$ is a time interval to transport said unit under test after testing is performed.

26. The method of claim 15, wherein:
said determining a troubleshooting time component comprises determining a time interval $T_{P2}$ associated with performing troubleshooting at a test set that is off-line from where testing of said UUT was performed;
said determining a repair time component comprises determining a time interval $T_{R3}$ associated with performing off-line repairs at a test set that is different from where troubleshooting of said UUT was performed;
said determining a disconnect time component comprises determining a time interval $T_{D1}$ associated with disconnecting said unit under test from said on-line test set where said testing of said UUT was performed; and
said determining a disconnect time component comprises determining a second time interval $T_{D2}$ associated with disconnecting said unit under test from said test set where said off-line troubleshooting of said UUT was performed.

27. The method of claim 26, wherein said average test time $T_A$ is:

$$\overline{T_A} = \left(\frac{T_C}{n}\right) + T_L + T_T + (P_C T_T + T_{D1} + T_L) \times \left(\frac{1 - Y_F}{Y_R}\right) + T_{D1},$$

where n represents an average lot size of said product.

28. The method of claim 26, further comprising:
determining a move time interval ($M_1$) associated with transferring a failed UUT from said test set associated with performing on-line testing of said UUT, to a test set associated with performing off-line troubleshooting of said UUT;
determining a move time interval ($M_3$) associated with transferring a troubleshot UUT from said test set associated with performing off-line troubleshooting of said UUT, to a workstation associated with performing off-line repair of said UUT; and
determining a move time interval ($M_4$) associated with transferring a repaired UUT from a workstation associated with performing off-line repair of said UUT, to said test set associated with performing online testing of said UUT.

29. The method of claim 28, further comprising:
determining an average product test time $T_B$, said average product test time being defined as:

$$\overline{T_B} = \frac{T_C}{n} + T_L + T_T +$$
$$(P_C T_T + T_{P2} + T_{D1} + T_{M1} + T_{R3} + T_{M3} + T_{D2} + T_{M4} + T_L) \times \left(\frac{1 - Y_F}{Y_R}\right) +$$
$$T_{D1} + T_S$$

, where n represents an average lot size of said product, and $T_S$ is a time interval to transport said unit under test after testing is performed.

30. The method of claim 15, wherein said average test time is:

$$\overline{T_A} = \frac{T_C}{n} + T_L + T_T + T_{D1} +$$
$$\left(\frac{1 - Y_F}{Y_R}\right) \times [P_C T_T + L_2(T_{P1} + L_3 T_{R1} + (1 - L_3)(T_{D1} + T_L)) +$$
$$(1 - L_2)(T_{D1} + T_L)] + L_2 L_3 T_S,$$

and wherein:
$L_2$ represents a percentage of units under test that are troubleshot at the online test set;
$L_3$ represents a percentage of units under test that are repaired at the online test set;
$T_{D1}$ represents a time interval associated with disconnecting said unit under test from said on-line test set where said testing of said UUT was performed;

$T_{P1}$ represents a time interval associated with performing on-line troubleshooting at a test set where testing of said UUT was performed;

$T_{R1}$ represents a time interval associated with performing on-line repairs at said test set where testing of said UUT was performed; and $T_S$ represents a time interval to transport said unit under test after testing is performed.

31. The method of claim 15, wherein said average product test time is:

$$\overline{T}_B = \frac{T_C}{n} + T_L + T_T + T_{D1} + T_S + \left(\frac{1-Y_F}{Y_R}\right)[L_2($$
$$P_C T_T + T_{P1} + L_3(T_{R1}) + (1-L_3)(T_{D1} + T_{M2} + T_{R3} + T_{M4} + T_L)) +$$
$$(1-L_2)(P_C T_T + T_{P2} + T_{D1} + T_{M1} + T_{D2} + T_{M4} +$$
$$T_L + L_4(T_{R2}) + (1-L_4)(T_{R3} + T_{M3}))],$$

and wherein:

$L_2$ represents a percentage of units under test that are troubleshot at the online test set;

$L_3$ represents a percentage of units under test that are repaired at the online test set;

$L_4$ represents a percentage of units under test that are repaired at an off-line troubleshooting station;

$T_{D1}$ represents a time interval associated with disconnecting said unit under test from said on-line test set where said testing of said UUT was performed;

$T_{D2}$ represents a second time interval associated with disconnecting said unit under test from said test set where said off-line troubleshooting of said UUT was performed;

$T_{P1}$ represents a time interval associated with performing on-line troubleshooting at a test set where testing of said UUT was performed;

$T_{P2}$ represents a time interval associated with performing troubleshooting at a test set that is off-line from where testing of said UUT was performed;

$T_{R1}$ represents a time interval associated with performing on-line repairs at said test set where testing of said UUT was performed;

$T_S$ represents a time interval to transport said unit under test after testing is performed;

$T_{R2}$ represents a time interval associated with performing on-line repairs at said off-line test set used for troubleshooting;

$T_{R3}$ represents a time interval $T_{R3}$ associated with performing off-line repairs at a workstation that is different from where troubleshooting of said UUT was performed;

$T_{M1}$ represents a move time interval associated with transferring a failed UUT from said test set associated with performing on-line testing of said UUT, to a test set associated with performing off-line troubleshooting of said UUT;

$T_{M2}$ represents a move time interval associated with transferring a failed UUT from said test set associated with performing online troubleshooting of said UUT, to a workstation at an off-line repair facility;

$T_{M3}$ represents a move time interval associated with transferring a troubleshot UUT from said test set associated with performing off-line troubleshooting of said UUT, to a workstation associated with performing off-line repair of said UUT;

$T_{M4}$ represents a move time interval associated with transferring a repaired UUT from a workstation associated with performing off-line repair of said UUT, to said test set associated with performing online testing of said UUT; and n represents an average lot size of said product.

32. Apparatus for establishing an average test time ($T_A$), comprising:

means for determining a first time interval ($T_G$) nominally associated with non-failing testing of a unit under test (UUT);

means for determining a second time interval ($T_{PR}$) nominally associated with troubleshooting and repairing a failed unit under test;

means for determining a percent yield (Y) nominally associated with a proportion of non-failing units under test, wherein said average test time ($T_A$) is defined as $T_A = T_G + (T_G + T_{PR})((1-Y)/Y)$.

33. The apparatus of claim 32, wherein said means for determining said percent yield (Y) further comprises:

means for determining a first yield ($Y_F$) associated with units of said product passing where no failures occurring during said testing; and means for determining a second yield ($Y_R$) associated with units of said product passing retest after failing initial testing.

34. The apparatus of claim 33, wherein said total average test time is $T_A = T_G + (T_G + T_{PR})((1-Y_F)/Y_R))$.

35. The apparatus of claim 34, further comprising:

means for determining a percent of test that is completed ($P_C$) prior to termination from a test failure, said average test time being $T_A = T_G + (P_C T_G + T_{PR})((1-Y_F)/Y_R)$.

36. The apparatus of claim 35, wherein said determining said first time interval $T_G$ comprises:

means for determining a load time component $T_L$ associated with loading a unit under test to a test set;

means for determining a test time component $T_T$ associated with testing said unit under test; and means for determining a time interval $T_C$ to prepare a test system for performing product testing.

37. The apparatus of claim 36, wherein said determining said second time interval $T_{PR}$ comprises:

means for determining a troubleshooting time component $T_P$ associated with troubleshooting a defective unit under test;

means for determining a repair time component $T_R$ associated with repairing said defective unit under test for a particular test set; and means for determining a disconnect time component $T_D$ associated with disconnecting said unit under test from said test set.

38. The apparatus of claim 37, wherein:

said means for determining a troubleshooting time component comprises determining a time interval $T_{P1}$ associated with performing on-line troubleshooting at a test set where testing of said UUT was performed;

said means for determining a repair time component comprises determining a time interval $T_{R1}$ associated with performing on-line repairs at said test set where testing of said UUT was performed; and said means for determining a disconnect time component comprises determining a time interval $T_{D1}$ associated with disconnecting said unit under test from said on-line test set.

39. The apparatus of claim 38, wherein said average test time $T_A$ is:

$$\overline{T_A} = \left(\frac{T_C}{n}\right) + T_L + T_T + (P_C T_T + T_{P1} + T_{R1}) \times \left(\frac{1 - Y_F}{Y_R}\right) + T_{D1} + T_S,$$

where n represents an average lot size of said product, and $T_S$ is a time interval to ship said unit under test after repairs are performed.

40. A computer readable medium including software instructions which when executed by a processor perform a method for establishing an average test time ($T_A$), comprising: comprising:
  determining a first time interval ($T_G$) nominally associated with non-failing testing of a unit under test (UUT);
  determining a second time interval ($T_{PR}$) nominally associated with troubleshooting and repairing a failed unit under test;
  determining a percent yield (Y) nominally associated with a proportion of non-failing units under test, wherein said average test time ($T_A$) is defined as $T_A = T_G + (T_G + T_{PR})((1-Y)/Y)$.

41. The computer readable medium of claim 40, wherein said determining said percent yield (Y) further comprises:
  determining a first yield ($Y_F$) associated with units of said product passing where no failures occurring during said testing; and
  determining a second yield ($Y_R$) associated with units of said product passing retest after failing initial testing.

42. The computer readable medium of claim 41, wherein said total average test time is $T_A = T_G + (T_G + T_{PR})((1-Y_F)/Y_R)$.

43. The computer readable medium of claim 42, further comprising:
  determining a percent of test that is completed ($P_C$) prior to termination from a test failure, said average test time being $T_A = T_G + (P_C T_G + T_{PR})((1-Y_F)/Y_R)$.

44. The computer readable medium of claim 43, wherein said determining said first time interval $T_G$ comprises:
  determining a load time component $T_L$ associated with loading a unit under test to a test set;
  determining a test time component $T_T$ associated with testing said unit under test; and
  determining a time interval $T_C$ to prepare a test system for performing product testing.

45. The computer readable medium of claim 44, wherein said determining said second time interval $T_{PR}$ comprises:
  determining a troubleshooting time component $T_P$ associated with troubleshooting a defective unit under test;
  determining a repair time component $T_R$ associated with repairing said defective unit under test for a particular test set; and
  determining a disconnect time component $T_D$ associated with disconnecting said unit under test from said test set.

46. The computer readable medium of claim 45, wherein:
  said determining a troubleshooting time component comprises determining a time interval $T_{P1}$ associated with performing on-line troubleshooting at a test set where testing of said UUT was performed;
  said determining a repair time component comprises determining a time interval $T_{R1}$ associated with performing on-line repairs at said test set where testing of said UUT was performed; and
  said determining a disconnect time component comprises determining a time interval $T_{D1}$ associated with disconnecting said unit under test from said on-line test set.

47. The computer readable medium of claim 46, wherein said average test time $T_A$ is:

$$\overline{T_A} = \left(\frac{T_C}{n}\right) + T_L + T_T + (P_C T_T + T_{P1} + T_{R1}) \times \left(\frac{1 - Y_F}{Y_R}\right) + T_{D1} + T_S,$$

where n represents an average lot size of said product, and $T_S$ is a time interval to ship said unit under test after repairs are performed.

* * * * *